US009779627B1

(12) United States Patent
Nepogodin et al.

(10) Patent No.: US 9,779,627 B1
(45) Date of Patent: Oct. 3, 2017

(54) METHOD, DEVICE AND SYSTEM FOR CALCULATING WEIGHTED DEPLOYMENT RULES IN AN EMERGENCY-VEHICLE-UNITS DEPLOYMENT SYSTEM FOR A GEOGRAPHICAL AREA

(71) Applicant: CAE Inc., Saint-Laurent, QC (CA)

(72) Inventors: Andrew Nepogodin, Kanata (CA); Brian Lypps, Ottawa (CA)

(73) Assignee: CAE INC., Saint-Laurent, QC (CA)

( * ) Notice: Subject to any disclaimer, the term of this patent is extended or adjusted under 35 U.S.C. 154(b) by 0 days.

(21) Appl. No.: 15/088,044

(22) Filed: Mar. 31, 2016

(51) Int. Cl.
G06F 19/00 (2011.01)
G08G 1/00 (2006.01)
(Continued)

(52) U.S. Cl.
CPC ......... *G08G 1/202* (2013.01); *G01C 21/3415* (2013.01); *G01C 21/3676* (2013.01); *G08G 1/0969* (2013.01); *G08G 1/096844* (2013.01)

(58) Field of Classification Search
CPC ............ G08G 1/022; G08G 1/096844; G08G 1/0969; G01C 21/3415; G01C 21/3676
(Continued)

(56) References Cited

U.S. PATENT DOCUMENTS 7,395,151 B2 * 7/2008 O'Neill .................. G06Q 10/06
340/988
2006/0132294 A1 * 6/2006 Spark .................. B60R 25/1003
340/426.1
(Continued)

FOREIGN PATENT DOCUMENTS

CA 2141171 8/1995
CA 2885962 9/2010
(Continued)

OTHER PUBLICATIONS

International Search Report in International Application No. PCT/CA2016/000088, "Method, Device and System for Calculating a List of Priority Indicators, in an Emergency-Vehicle-Units Deployment system, for Each of a Plurality of Posts," mailed Nov. 17, 2016.
(Continued)

*Primary Examiner* — Shardul Patel
(74) *Attorney, Agent, or Firm* — Gowling WLG Canada; Benoit Yelle

(57) ABSTRACT

Method, device and system for deploying emergency vehicle units in a geographical area. A computer receives, from at least one external resource, location data and status information for each of a plurality of emergency vehicle units. The location data and status information is stored in a memory buffer. The computer applies a deployment calculation formula for calculating a deployment recommendation considering a list of weighted deployment rules, the location data, the status information and a list of priority indicators. Display the deployment recommendation. An updated deployment recommendation is received from the user interface module. Display the updated deployment recommendation. Calculate an updated list of weighted deployment rules in order for the deployment calculation formula to provide a new deployment recommendation. Display the new deployment recommendation.

25 Claims, 6 Drawing Sheets

(51) Int. Cl.
*G01C 21/34* (2006.01)
*G01C 21/36* (2006.01)
*G08G 1/0968* (2006.01)
*G08G 1/0969* (2006.01)

(58) Field of Classification Search
USPC .......................................... 701/117; 707/755
See application file for complete search history.

(56) References Cited

U.S. PATENT DOCUMENTS

| | | | | |
|---|---|---|---|---|
| 2013/0201316 | A1* | 8/2013 | Binder | H04L 67/12 348/77 |
| 2013/0332474 | A1* | 12/2013 | Glaubman | G06F 17/30312 707/755 |
| 2015/0324720 | A1* | 11/2015 | Briggs | G07C 5/006 705/7.22 |
| 2016/0379486 | A1* | 12/2016 | Taylor | G08G 1/0141 340/905 |

FOREIGN PATENT DOCUMENTS

| | | |
|---|---|---|
| CA | 2744473 | 12/2011 |
| CN | 103500501 | 1/2014 |
| WO | WO 0063819 | 10/2000 |
| WO | WO 2014200915 | 12/2014 |

OTHER PUBLICATIONS

International Search Report in International Application No. PCT/CA2016/000089, "Method, Device and System or Calculating Weighted Deployment Rules in an Emergency-Vehicle-Units Deployment System for a Geographical Area," mailed Dec. 2, 2016.
International Search Report in International Application No. PCT/CA2016/000090, "Method, Device and System for Continuously Recommending a Deployment of Emergency Vehicle Units," mailed Dec. 6, 2016.
Venkata S. Inampudi and Aura Ganz, "Web Based Tool for Resource Allocation in Multiple Mass Casualty Incidents", IEEE, 2009.

* cited by examiner

3000

```
receive location data and status information for each of a
plurality of emergency vehicle units 3010
                        ↓
store the location data and status information 3020
                        ↓
apply a deployment calculation formula for calculating a
deployment recommendation considering a list of
weighted deployment rules, the location data, the status
information and a list of priority indicators 3030
                        ↓
display the deployment recommendation 3040
                        ↓
receive an updated deployment recommendation 3050
                        ↓
display the updated deployment recommendation 3060
                        ↓
calculate an updated list of weighted deployment rules in
order for the deployment calculation formula to provide a
new deployment recommendation 3070
```

METHOD, DEVICE AND SYSTEM FOR CALCULATING WEIGHTED DEPLOYMENT RULES IN AN EMERGENCY-VEHICLE-UNITS DEPLOYMENT SYSTEM FOR A GEOGRAPHICAL AREA

PRIORITY STATEMENT

This non-provisional patent application claims priority based upon the PCT patent application entitled "METHOD, DEVICE AND SYSTEM FOR CALCULATING WEIGHTED DEPLOYMENT RULES IN AN EMERGENCY-VEHICLE-UNITS DEPLOYMENT SYSTEM FOR A GEOGRAPHICAL AREA", filed on even date herewith in the name of CAE Inc., herein incorporated in its entirety.

TECHNICAL FIELD

The present invention relates to the deployment of emergency vehicle units within a geographical area, and more particularly, to calculating weighted deployment rules in an emergency-vehicle-units deployment system for a geographical area.

BACKGROUND

Paramedic services deliver emergency medical services to a city's residents. Paramedic services use communications officers to dynamically deploy resources (e.g., ambulances) according to a predetermined deployment strategy. The paramedic services attempt to deploy resources so as to minimize response times. Traditionally, the deployment strategies have been sub-optimal because they are based on best guesses, intuition, and personal experience. Moreover, the implementation of the deployment strategy is affected by the communications officers' workload, awareness of the situation, and experience level.

The present invention aims at improving the deployment strategies and the implementation of those strategies.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A first aspect of a first set of embodiments of the invention is directed to a method for calculating a list of priority indicators, in an emergency-vehicle-units deployment system, for each of a plurality of posts in a geographical area. The method comprises receiving, from at least one external resource, location data and status information for each of a plurality of emergency vehicle units. The method further comprises storing location data and status information for each of the plurality of emergency vehicle units in a memory buffer, storing a list of priority indicators associated to each of the plurality of posts in the memory buffer, storing in the memory buffer a list of weighted deployment rules for deploying the plurality of emergency vehicle units to the plurality of posts, storing historical data of past deployment in the memory buffer, each past deployment providing a target post from the plurality of posts for one of the plurality of emergency vehicle units and an associated event, and storing a list of upcoming events for the geographical area in the memory buffer. The method also comprises calculating an updated list of priority indicators for each of the plurality of posts based at least on the historical data and the list of upcoming events, and storing the updated list of priority indicators in the memory buffer. The method then comprises calculating a deployment recommendation considering the list of weighted deployment rules, the location data, the status information and the updated list of priority indicators from the memory buffer, the deployment recommendation comprising one or more suggested deployments, each suggested deployment providing a suggested target post from the plurality of posts for one of the plurality of emergency vehicle units, and at a computer, sending the deployment recommendation to a user interface module for display.

Optionally, the method may further comprise, at the computer, receiving an acceptance of the deployment recommendation from the user interface module. As a further option, the method may comprise, following the acceptance of the deployment recommendation, sending the deployment recommendation to a plurality of mobile computers located at each of the plurality of emergency vehicle units for display.

Optionally, the method may further comprise, at the computer, sending a list of steps to implement the deployment recommendation to the user interface module for display.

As an option, the method may further comprise, at the computer, receiving a user updated list of priority indicators for each of at least one of the plurality of posts from the user interface module.

As an option, the user interface module may display the deployment recommendation in a textual form.

Optionally, the user interface module may display the deployment recommendation in a graphical form. As a further option, each of the one or more suggested deployments may be represented as an arrow from one of the plurality of emergency vehicle units to the suggested target post of the plurality of posts. As a further option, the graphical form may comprise a polygon for representing a geographical sub-area within the geographical area that is reachable by the plurality of emergency vehicle units within a specified time based on the location data, the status information, the historical data, and the list of upcoming events.

A second aspect of the first set of embodiments of the invention is directed to a computer for calculating a list of priority indicators, in an emergency-vehicle-units deployment system, for each of a plurality of posts in a geographical area. The computer comprises a storage module, a user interface module, and a processor module. The storage module is for storing location data and status information for each of a plurality of emergency vehicle units, a list of priority indicators associated to each of the plurality of posts, a list of weighted deployment rules for deploying the plurality of emergency vehicle units to the plurality of posts, historical data of past deployment, each past deployment providing a target post from the plurality of posts for one of the plurality of emergency vehicle units and an associated event, and a list of upcoming events for the geographical area. The user interface module is for displaying a deployment recommendation. The processor module is configured to receive, from at least one external resource, location data and status information for each of a plurality of emergency vehicle units, and store the location data and status information for each of the plurality of emergency vehicle units in a memory buffer in the storage module. The processor module is also configured to calculate an updated list of priority indicators for each of the plurality of posts based at least on the historical data and the list of upcoming events, and store the updated list of priority indicators in the memory buffer in the storage module. The processor module is further configured to calculate a deployment recommendation considering the list of weighted deployment rules, the location data, the status information and the updated list of priority indicators in the storage module, the deployment recommendation comprising one or more suggested deployments, each suggested deployment providing a suggested target post from the plurality of posts for one of the plurality of emergency vehicle units. The processor module is configured to send the deployment recommendation to the user interface module for display.

Optionally, the processor module may further be configured to receive an acceptance of the deployment recommendation from the user interface module.

Optionally, the processor module may further be configured to send a list of steps to implement the deployment recommendation to the user interface module for display.

Optionally, the processor module may further be configured to receive a user updated list of priority indicators for each of at least one of the plurality of posts from the user interface module.

As an option, the processor module may further be configured to send the deployment recommendation to a plurality of mobile computers located at each of the plurality of emergency vehicle units for display.

As an option, the user interface module may display the deployment recommendation in a textual form.

As an option, the user interface module may display the deployment recommendation in a graphical form. As a further option each of the one or more suggested deployments may be represented as an arrow from one of the plurality of emergency vehicle units to the suggested target post of the plurality of posts. As another option, the graphical form may comprise a polygon for representing a geographical sub-area within the geographical area that is reachable by the plurality of emergency vehicle units within a specified time based on the location data, the status information, the historical data, and the list of upcoming events.

A third aspect of the first set of embodiments of the invention is directed to a system for calculating a list of priority indicators, in an emergency-vehicle-units deployment system, for each of a plurality of posts in a geographical area. The system comprises a network, which comprises a computer and at least one server. The computer is configured to receive location data and status information for each of a plurality of emergency vehicle units from the at least one server through the network. The computer is further configured to store the location data and status information for each of the plurality of emergency vehicle units in a memory buffer, store a list of priority indicators associated to each of the plurality of posts in the memory buffer, store in the memory buffer a list of weighted deployment rules for deploying the plurality of emergency vehicle units to the plurality of posts, store historical data of past deployment in the memory buffer, each past deployment providing a target post from the plurality of posts for one of the plurality of emergency vehicle units and an associated event, and store a list of upcoming events for the geographical area in the memory buffer. The computer is further configured to calculate an updated list of priority indicators for each of the plurality of posts based at least on the historical data and the list of upcoming events, and store the updated list of priority indicators in the memory buffer. The computer is configured to calculate a deployment recommendation considering the list of weighted deployment rules, the location data, the status information and the updated list of priority indicators from the memory buffer, the deployment recommendation comprising one or more suggested deployments, each suggested deployment providing a suggested target post from the plurality of posts for one of the plurality of emergency vehicle units.

Optionally, the computer may further send the deployment recommendation to a user interface module for display.

Optionally, the network may further comprise a plurality of unit computers associated to each of the plurality of emergency vehicle units, and wherein the at least one server receives the location data and status information for each of the plurality of emergency vehicle units from the unit computers through the network. As a further option, the computer may send the deployment recommendation to the plurality of unit computers through the network for display.

As an option, the at least one server may be a plurality of servers associated to each of the plurality of emergency vehicle units.

As an option, the network may further comprise a client computer, and the computer may send the deployment recommendation to the client computer for display.

Optionally, the computer may receive a user updated list of priority indicators for each of at least one of the plurality of posts from the user interface module.

A first aspect of a second set of embodiments of the invention is directed to a method of calculating weighted deployment rules in an emergency-vehicle-units deployment system for a geographical area. The method comprises receiving, from at least one external resource, location data and status information for each of a plurality of emergency vehicle units. The method further comprises storing the location data and status information for each of the plurality of emergency vehicle units in a memory buffer, storing a list of priority indicators associated to each of a plurality of posts in the memory buffer, and storing in the memory buffer a list of weighted deployment rules for deploying the plurality of emergency vehicle units to the plurality of posts. The method also comprises applying a deployment calculation formula for calculating a deployment recommendation considering the list of weighted deployment rules, the location data, the status information and the list of priority indicators from the memory buffer, the deployment recommendation comprising one or more suggested deployments, each suggested deployment providing a suggested target post from the plurality of posts for one of the plurality of emergency vehicle units, and at the computer, sending the deployment recommendation to the user interface module for display. The method then comprises at the computer, receiving an updated deployment recommendation from the user interface module, and at the computer, sending the updated deployment recommendation to the user interface module for display. The method further comprises calculating an updated list of weighted deployment rules in order for the deployment calculation formula to provide a new deployment recommendation considering the updated list of weighted deployment rules, new location data, new status information and a new list of priority indicators, and at the computer, sending the new deployment recommendation to the user interface module for display.

Optionally, a first user may input the updated deployment recommendation, and a second user may view the new deployment recommendation.

Optionally, the method may further comprise, at the computer, sending a list of steps to implement the updated deployment recommendation to the user interface module for display.

Optionally, the method may further comprise, at the computer, receiving a user updated list of weighted deployment rules from the user interface module to provide the new deployment recommendation considering the user updated list of weighted deployment rules, the new location data, the new status information and the new list of priority indicators.

As an option, the method may further comprise sending the updated deployment recommendation to a plurality of mobile computers located at each of the plurality of emergency vehicle units for display.

As an option, the user interface module may display the updated deployment recommendation in a textual form.

As an option, the user interface module displays the updated deployment recommendation in a graphical form. As a further option, each of the one or more suggested deployments may be represented as an arrow from one of the plurality of emergency vehicle units to the suggested target post of the plurality of posts. As another option, the graphical form may comprise a polygon for representing a geographical sub-area within the geographical area that is reachable by the plurality of emergency vehicle units within a specified time based on the location data and the status information.

A second aspect of the second set of embodiments of the invention is directed to a computer for calculating weighted deployment rules in an emergency-vehicle-units deployment system for a geographical area, the computer comprising a storage module, a user interface module, and a processor module. The storage module is for storing location data and status information for each of a plurality of emergency vehicle units, storing a list of priority indicators associated to each of a plurality of posts, and storing a list of weighted deployment rules for deploying the plurality of emergency vehicle units to the plurality of posts. The user interface module is for displaying a deployment recommendation. The processor module is configure to receive, from at least one external resource, location data and status information for each of a plurality of emergency vehicle units, and store the location data and status information for each of the plurality of emergency vehicle units in a memory buffer in the storage module. The processor module is further configured to apply a deployment calculation formula for calculating a deployment recommendation considering the list of weighted deployment rules, the location data, the status information and the list of priority indicators from the memory buffer, the deployment recommendation comprising one or more suggested deployments, each suggested deployment providing a suggested target post from the plurality of posts for one of the plurality of emergency vehicle units. The processor module is also configured to send the deployment recommendation to the user interface module for display. The processor module is configured to receive an updated deployment recommendation from the user interface module, and send the updated deployment recommendation to the user interface module for display. The processor module is also configured to calculate an updated list of weighted deployment rules in order for the deployment calculation formula to provide a new deployment recommendation considering the updated list of weighted deployment rules, new location data, new status information and a new list of priority indicators. The processor module is configured to send the new deployment recommendation to the user interface module for display.

Optionally, a first user may input the updated deployment recommendation, and a second user may view the new deployment recommendation.

Optionally, the processor module is further configured to send a list of steps to implement the updated deployment recommendation to the user interface module for display.

Optionally, the processor is further configured receive a user updated list of weighted deployment rules from the user interface module to provide the new deployment recommendation considering the user updated list of weighted deployment rules, the new location data, the new status information and the new list of priority indicators.

Optionally, the processor is further configured to send the updated deployment recommendation to a plurality of mobile computers located at each of the plurality of emergency vehicle units for display.

Optionally, the user interface module may display the deployment recommendation in a textual form.

Optionally, the user interface module may display the deployment recommendation in a graphical form. As a further option, each of the one or more suggested deployments may be represented as an arrow from one of the plurality of emergency vehicle units to the suggested target post of the plurality of posts. As another option, the graphical form comprises a polygon for representing a geographical sub-area within the geographical area that is reachable by the plurality of emergency vehicle units within a specified time based on the location data and the status information.

A third aspect of the second set of embodiments of the invention is directed to a system for calculating weighted deployment rules in an emergency-vehicle-units deployment system for a geographical area. The system comprises a network, which comprises a computer and at least one server. The computer is configured to receive location data and status information for each of a plurality of emergency vehicle units from the at least one server through the network. The computer is configured to store the location data and status information for each of the plurality of emergency vehicle units in a memory buffer, store a list of priority indicators associated to each of a plurality of posts in the memory buffer, and store in the memory buffer a list of weighted deployment rules for deploying the plurality of emergency vehicle units to the plurality of posts. The computer is configured to apply a deployment calculation formula for calculating a deployment recommendation considering the list of weighted deployment rules, the location data, the status information and the list of priority indicators from the memory buffer, the deployment recommendation comprising one or more suggested deployments, each suggested deployment providing a suggested target post from the plurality of posts for one of the plurality of emergency vehicle units. The computer is configured to send the deployment recommendation to the user interface module for display. The computer is configured to receive an updated deployment recommendation from the user interface module. The computer is configured to calculate an updated list of weighted deployment rules in order for the deployment calculation formula to provide a new deployment recommendation considering the updated list of weighted deployment rules, new location data, new status information and a new list of priority indicators.

Optionally, the computer may further send the updated deployment recommendation to a user interface module for display.

Optionally, the computer may further send the new deployment recommendation to a user interface module for display.

Optionally, the network may further comprise a plurality of unit computers associated to each of the plurality of emergency vehicle units, and wherein the at least one server receives the location data and status information for each of the plurality of emergency vehicle units from the unit computers through the network. As a further option, the computer may send the updated deployment recommendation to the plurality of unit computers through the network for display.

Optionally, the at least one server may be a plurality of servers associated to each of the plurality of emergency vehicle units.

Optionally, the network may further comprise a client computer, and wherein the computer sends the updated deployment recommendation to the client computer for display.

Optionally, the network may further comprise a client computer, and wherein the computer sends the new deployment recommendation to the client computer for display.

Optionally, a first user may input the updated deployment recommendation, and a second user may view the new deployment recommendation.

Optionally, the computer may further receive a user updated list of weighted deployment rules from the user interface module to provide the new deployment recommendation considering the user updated list of weighted deployment rules, the new location data, the new status information and the new list of priority indicators.

A first aspect of a third set of embodiments of the invention is directed to a method for continuously recommending a deployment of emergency vehicle units towards one or more of a plurality of posts in a geographical area. The method comprises receiving, from at least one external resource, location data and status information for each of a plurality of emergency vehicle units. The method further comprises storing the location data and status information for each of the plurality of emergency vehicle units in a memory buffer, storing a list of priority indicators associated to each of the plurality of posts in the memory buffer, and storing in the memory buffer a list of weighted deployment rules for deploying the plurality of emergency vehicle units to the plurality of posts. The method also comprises upon receiving a trigger, calculating a deployment recommendation based on the list of weighted deployment rules, the location data, the status information and the list of priority indicators from the memory buffer, the deployment recommendation comprising one or more suggested deployments, each suggested deployment providing a suggested target post from the plurality of posts for one of the plurality of emergency vehicle units. The method comprises at a computer, upon calculating the deployment recommendation, sending the deployment recommendation to a user interface module of the computer for display.

Optionally, the method may further comprise sending the deployment recommendation to a plurality of mobile computers located at each of the plurality of emergency vehicle units for display.

Optionally, the user interface module may display the deployment recommendation in a textual form.

Optionally, the user interface module may display the deployment recommendation in a graphical form. As a further option, each of the one or more suggested deployments is represented as an arrow from one of the plurality of emergency vehicle units to the suggested target post of the plurality of posts. As another option, the graphical form may comprise a polygon for representing a geographical sub-area within the geographical area that is reachable by the plurality of emergency vehicle units within a specified time based on the location data and the status information.

Optionally, the trigger may be generated periodically with a frequency. Optionally, the method may further comprise receiving the frequency from the user interface module.

Optionally, the trigger may be an external event, including a change in the location data or status information.

A second aspect of the third set of embodiments of the invention is directed to a computer for continuously recommending a deployment of emergency vehicle units towards one or more of a plurality of posts. The computer comprises a storage module, a user interface module, and a processor module. The storage module is for storing location data and status information for each of a plurality of emergency vehicle units, storing a list of priority indicators associated to each of the plurality of posts, and storing a list of weighted deployment rules for deploying the plurality of emergency vehicle units to the plurality of posts. The user interface module is for displaying a deployment recommendation. The processor module is configured to receive, from at least one external resource, location data and status information for each of a plurality of emergency vehicle units, and to store location data and status information for each of the plurality of emergency vehicle units in a memory buffer in the storage module. The processor module is further configured to, upon receiving a trigger, calculate a deployment recommendation considering the list of weighted deployment rules, the location data, the status information and the updated list of priority indicators in the storage module, the deployment recommendation comprising one or more suggested deployments, each suggested deployment providing a suggested target post from the plurality of posts for one of the plurality of emergency vehicle units. The processor module is configured to send the deployment recommendation to the user interface module for display.

Optionally, the processor module may further be for sending the deployment recommendation to a plurality of mobile computers located at each of the plurality of emergency vehicle units for display.

Optionally, the user interface module may display the deployment recommendation in a textual form.

Optionally, the user interface module may display the deployment recommendation in a graphical form. Optionally, each of the one or more suggested deployments is represented as an arrow from one of the plurality of emergency vehicle units to the suggested target post of the plurality of posts. Optionally, the graphical form may comprise a polygon for representing a geographical sub-area within the geographical area that is reachable by the plurality of emergency vehicle units within a specified time based on the location data and the status information.

Optionally, the trigger may be generated periodically with a frequency. Optionally, the frequency may be received from the user interface module.

Optionally, the trigger may be an external event, including a change in the location data or status information.

A third aspect of the third set of embodiments of the invention is directed to a system for continuously recommending a deployment of emergency vehicle units towards one or more of a plurality of posts. The system comprises a network, which comprises a computer and at least one server. The computer is configured to receive location data and status information for each of a plurality of emergency vehicle units from the at least one server through the network. The computer is configured to store the location data and status information for each of the plurality of emergency vehicle units in a memory buffer, store a list of priority indicators associated to each of the plurality of posts in the memory buffer, and store in the memory buffer a list of weighted deployment rules for deploying the plurality of emergency vehicle units to the plurality of posts. The computer is configured to upon receiving a trigger, calculate a deployment recommendation considering the list of weighted deployment rules, the location data, the status information and the updated list of priority indicators from the memory buffer, the deployment recommendation comprising one or more suggested deployments, each suggested deployment providing a suggested target post from the plurality of posts for one of the plurality of emergency vehicle units.

Optionally, the computer may further send the deployment recommendation to a user interface module for display.

Optionally, the network may further comprise a plurality of unit computers associated to each of the plurality of emergency vehicle units, and wherein the at least one server receives the location data and status information for each of the plurality of emergency vehicle units from the unit computers through the network.

Optionally, the computer may further send the deployment recommendation to the plurality of unit computers through the network for display.

Optionally, the at least one server may be a plurality of servers associated to each of the plurality of emergency vehicle units.

Optionally, the network may further comprise a client computer, and wherein the computer sends the deployment recommendation to the client computer for display.

Optionally, the trigger may be generated periodically with a frequency. Optionally, the computer may receive the frequency from a user interface module.

Optionally, the trigger may be an external event, including a change in the location data or status information.

Optionally, the computer may receive the trigger from the server through the network.

Optionally, the computer may receive the trigger from one or more of the plurality of unit computers through the network.

BRIEF DESCRIPTION OF THE DRAWINGS

Further features and exemplary advantages of the present invention will become apparent from the following detailed description, taken in conjunction with the appended drawings, in which:

FIG. 3 is a flow chart of an exemplary method of a second set of embodiments for calculating weighted deployment rules in an emergency-vehicle-units deployment system for a geographical area;

FIG. 5 is an example of the deployment panel component of a graphical user interface for an exemplary computing system for deploying emergency vehicle units.

DETAILED DESCRIPTION

Figure 1:
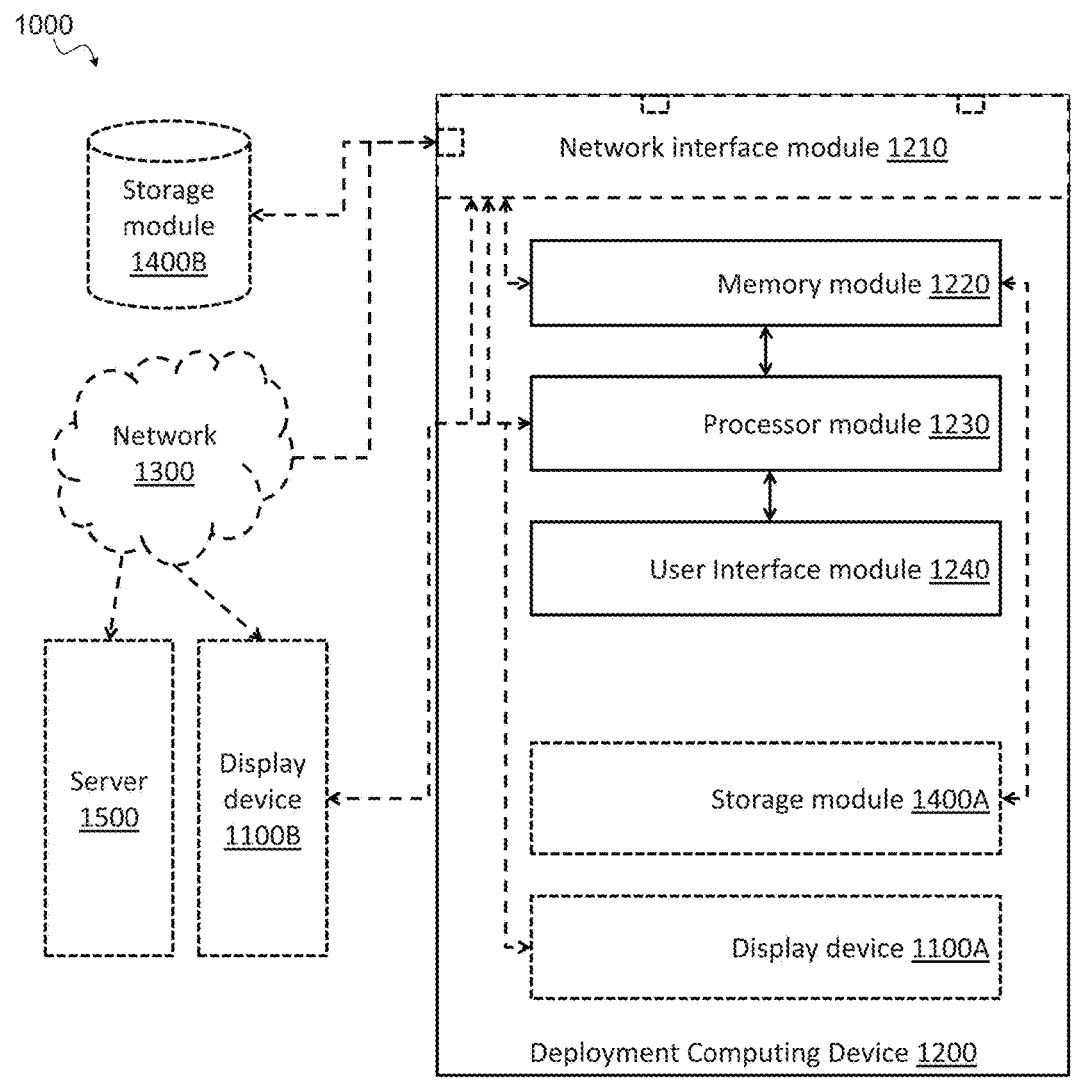
FIG. 1 is a logical modular representation of an exemplary system comprising a computing device for deploying emergency vehicle units.

In a preferred embodiment of a first set of embodiments of the present invention, a user uses a Deployment Computing Device ("DCD") to deploy emergency vehicle units (e.g., ambulances, fire trucks, and police vehicles) to a plurality of posts within a geographical area. A post is a physical location where one or more emergency vehicles wait until they are called to an emergency. Each post has a priority. Emergency vehicle units are deployed to posts after responding to an emergency. The DCD continuously receives location data and status information regarding the emergency vehicle units from a server. The DCD stores the location data and status information in a memory buffer. When the user clicks the "Recommend" button, the DCD calculates and displays a deployment recommendation to the user. A deployment recommendation comprises one or more suggested deployments, where each suggested deployment is a suggested post for one of the emergency vehicle units in need of a post. A deployment recommendation may be displayed to the user in a textual format (e.g., in a table) or a graphical format (e.g., as arrows from emergency vehicle units to the suggested posts on a map). When calculating the deployment recommendation, the DCD considers such things as the location data, the status information, a weighted list of deployment rules, and a list of priority indicators. The weighted list of deployment rules comprise a number of rules for assigning emergency vehicle units to posts, such "total travel time should be minimized". The weight associated with each rule reflects the importance of satisfying that rule, or the cost of not satisfying the rule. The list of priority indicators are the priorities for each of the posts. The DCD calculates the list of priority indicators based on historical data (e.g., historical travel times) and a list of upcoming events (e.g., rush hour or a sporting event) for the geographical area. Once the deployment recommendation has been displayed to the user, the user can accept the deployment recommendation by clicking an "Accept" button. The DCD then displays a sequence of steps for implementing the deployment recommendation.

In a preferred embodiment of a second set of embodiments of the present invention, a user uses a Deployment Computing Device ("DCD") to deploy emergency vehicle units (e.g., ambulances, fire trucks, and police vehicles) to a plurality of posts within a geographical area. A post is a physical location where one or more emergency vehicles wait until they are called to an emergency. Each post has a priority. Emergency vehicle units are deployed to posts after responding to an emergency. The DCD continuously receives location data and status information regarding the emergency vehicle units from a server. The DCD stores the location data and status information in a memory buffer. When the user clicks the "Recommend" button, the DCD calculates and displays a deployment recommendation to the user. A deployment recommendation comprises one or more suggested deployments, where each suggested deployment is a suggested post for one of the emergency vehicle units in need of a post. A deployment recommendation may be displayed to the user in a textual format (e.g., in a table) or a graphical format (e.g., as arrows from emergency vehicle units to the suggested posts on a map). When calculating the deployment recommendation, the DCD considers such things as the location data, the status information, a weighted list of deployment rules, and a list of priority indicators. The weighted list of deployment rules comprise a number of rules for assigning emergency vehicle units to posts, such "total travel time should be minimized". The weight associated with each rule reflects the importance of satisfying that rule, or the cost of not satisfying the rule. The list of priority indicators are the priorities for each of the posts. Once the deployment recommendation has been displayed to the user, the user can accept the deployment recommendation by clicking an "Accept" button or make changes to the deployment recommendation, thereby creating an updated deployment recommendation. Overriding the deployment recommendation engages the system training mode: The DCD uses the updated deployment recommendation to train the system by calculating an updated weighted list of deployment rules based on the updated deployment recommendation provided by the user. The DCD will then use the updated weighted list of deployment rules to calculate deployment recommendations in the future, such that the future deployment recommendations resemble the deployment recommendations preferred by the user.

In a preferred embodiment of a third set of embodiments of the present invention, a user uses a Deployment Computing Device ("DCD") to deploy emergency vehicle units (e.g., ambulances, fire trucks, and police vehicles) to a plurality of posts within a geographical area. A post is a physical location where one or more emergency vehicles wait until they are called to an emergency. Each post has a priority. Emergency vehicle units are deployed to posts after responding to an emergency. The DCD continuously receives location data and status information regarding the emergency vehicle units from a server. The DCD stores the location data and status information in a memory buffer. The DCD calculates and displays a deployment recommendation to the user whenever a trigger is received. The trigger may be an external event, such as an emergency vehicle unit being called to an emergency or changing its physical location more than a threshold distance. The triggers and other parameters (e.g., the threshold distance) may be hard coded or set by the user. A deployment recommendation comprises one or more suggested deployments, where each suggested deployment is a suggested post for one of the emergency vehicle units in need of a post. A deployment recommendation may be displayed to the user in a textual format (e.g., in a table) or a graphical format (e.g., as arrows from emergency vehicle units to the suggested posts on a map). When calculating the deployment recommendation, the DCD considers such things as the location data, the status information, a weighted list of deployment rules, and a list of priority indicators. The weighted list of deployment rules comprise a number of rules for assigning emergency vehicle units to posts, such "total travel time should be minimized". The weight associated with each rule reflects the importance of satisfying that rule, or the cost of not satisfying the rule. The list of priority indicators are the priorities for each of the posts. The DCD may display a sequence of steps for implementing the deployment recommendation.

Reference is made to the drawings in which FIG. 1 shows a logical modular representation of an exemplary system 1000 comprising a DCD 1200 for deploying emergency vehicle units. The exemplary system 1000 will be used to illustrate the first, second, and third sets of embodiments. The DCD 1200 comprises a memory module 1220, a processor module 1230, and a user interface module 1240. The DCD 1200 may further comprise a network interface module 1210. The exemplified system 1000 comprises a display module 1100 (e.g., connected to the DCD 1100B or integrated with the DCD 1100A) and a network 1300, which may be used to connect to the display device 1100B. The exemplified system 1000 may comprise a storage module 1400 (e.g., integrated with the DCD 1400A or connected to the DCD through the network 1400B). For example, the DCD 1200 could be a desktop computer, a server, or a mobile computing device (e.g., smart phone or tablet).

Figure 2:
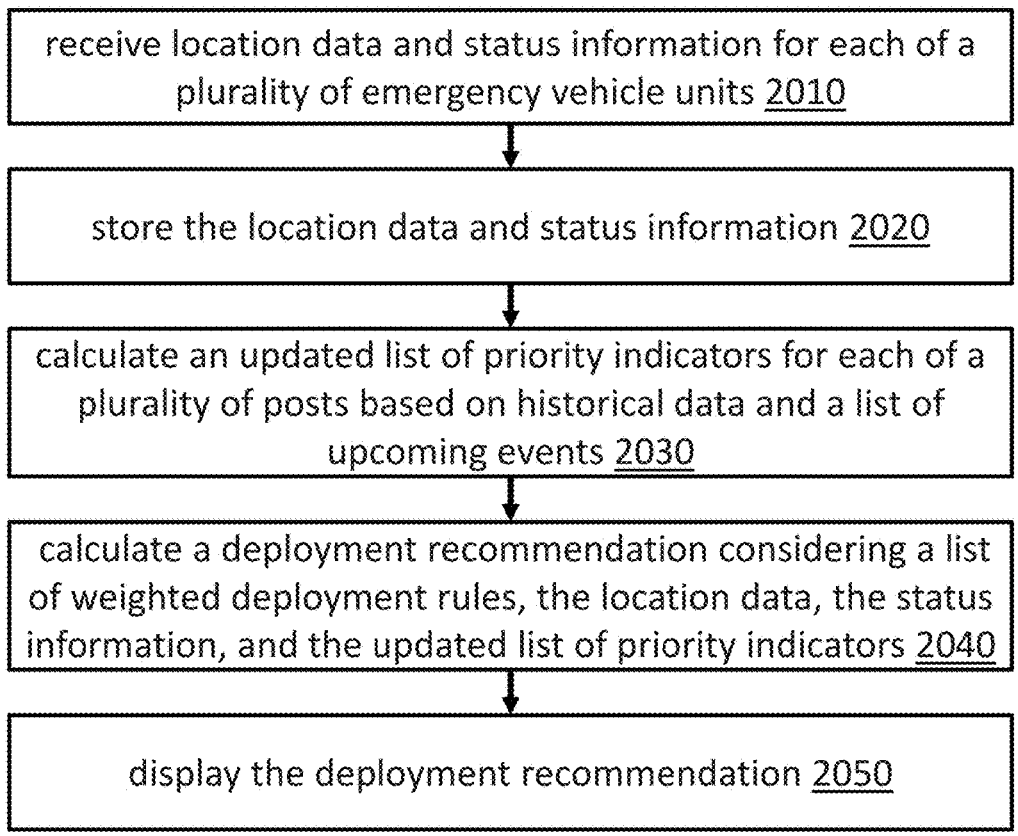
FIG. 2 is a flow chart of an exemplary method of a first set of embodiments for calculating a list of priority indicators, in an emergency-vehicle-units deployment system, for each of a plurality of posts in a geographical area.

Reference is now made concurrently to FIG. 1 and FIG. 2, which shows a flow chart of an exemplary method 2000 of a first set of embodiments for calculating a list of priority indicators, in an emergency-vehicle-units deployment system, for each of a plurality of posts. The method 2000 comprises receiving, from at least one external resource, location data and status information for each of a plurality of emergency vehicle units 2010. The location data and status information are received at the DCD 1200. The external resource may be a server 1500 connected to the DCD 1200 through the network 1300, where the DCD 1200 receives the location data and status information from the server 1500 through the network 1300. The status information for each of the emergency vehicle units may include such information as whether the unit is active, shift schedules (i.e., start of shift and end of shift time), unit attributes (e.g., regular units, specialized units), unit assignment to low-density or high-density areas, unit's availability for deployment, and the post the unit is at or assigned to. A specialized unit is an emergency vehicle unit where the crew and/or the vehicle have special attributes. For example, specialized units may include: an emergency vehicle unit that is in training mode, an emergency vehicle unit wherein one or more of its crew are students, an emergency vehicle unit that has a single crew member, an emergency vehicle unit that is a car, an emergency vehicle unit that is an ambulance for handling chemical spills. The status information may also include information about meal periods (e.g., time window when unit requires a meal period, time when unit is on meal period, completed meal periods, and missed meal periods), number of deployments per unit per shift, cumulative kilometers driven in a shift, idle time at a location, the number of times a unit has been rerouted before reaching a post, and the time a unit has been on route to a destination. This information may also be calculated and/or tracked by the DCD 1200 rather than received as status information from the server 1500. The DCD 1200 and the server 1500 may communicate using TCP/IP and Ethernet or ATM SONET/SDNET over air, copper wires, optical fiber, or any other physical support capable of carrying data. Skilled persons will readily understand that many different network protocols could be used without affecting the functioning of the invention. The network 1300 may be the Internet or other wide area network. The network 1300 may also be a local area network. The location data and status information may be in a textual format (e.g., XML or JSON) or a binary format. The location data and status information may be manually inputted into the DCD 1200. The DCD 1200 may receive the location data and status information continuously in real-time. Alternatively, the DCD 1200 may receive the location data and status information periodically (e.g., every five minutes). As a further alternative, the DCD 1200 may receive the location data and status information only when the user requests a deployment recommendation.

The method 2000 comprises storing location data and status information for each of the plurality of emergency vehicle units in a memory buffer 2020. For example, the location data and status information may be stored in the memory module 1220 of the DCD 1200. Alternatively, the location data and status information may be stored in the storage module 1400.

The method 2000 comprises storing a list of priority indicators associated to each of a plurality of posts in the memory buffer. For instance, the list of priority indicators associated to each of the plurality of posts may be stored in the memory module 1220 of the DCD 1200, or they may be stored in the storage module 1400. The list of priority indicators comprise a priority for each of the posts. The priority is used by the DCD 1200 when calculating a deployment of emergency vehicle units to posts. For example, a post with a higher priority than another post will, other things being equal, receive an emergency vehicle unit faster than the post with the lower priority. The priorities of the posts may be represented using an ordered ranking. That is, if there are N posts, each post receives a unique priority number between 1 and N, where the post with priority N has the highest priority, and the post with the priority 1 has the lowest priority, or vice versa. A skilled person will understand that there are many other means for representing the relative priorities of the posts.

The method 2000 comprises storing in the memory buffer a list of weighted deployment rules for deploying the plurality of emergency vehicle units to the plurality of posts. For example, the list of weighted deployment rules may be stored in the memory module 1220 of the DCD 1200 or in the storage module 1400. The list of weighted deployment rules may comprise the following rules:

The total travel time should be minimized. The travel time when emergency vehicle units go to their posts should be as little as possible;

If an emergency vehicle unit is already at a post, its redeployment is penalized. The penalty is greatest for the first 10 minutes (after arrival to the current post); then the penalty is less if the arrival time is 10-30 minutes ago; and the penalty is smallest if after 30 minutes;

The drive time to posts with higher priority should be minimized. The higher the priority the greater the penalty for the estimate arrival time duration;

If an emergency vehicle unit is en route to a post, its rerouting to another post is penalized; and the second (and following) rerouting is penalized even more;

If an emergency vehicle unit is at a meal dedicated post (i.e., a post with a kitchen) and has a meal-in-progress status, its redeployment is penalized. Penalty depends on the time in the meal break, and number of meal break (i.e., first or second);

Deploying a low density unit far from its starting rural post is penalized. The greater the drive time to the starting post the greater the penalty;

Deploying a high density unit far from headquarters within the last 60 minutes of its shift is penalized. The longer the drive time the greater the penalty;

Deploying a specialized emergency vehicle unit to a post that is not explicitly dedicated for specialized units is penalized;

Assigning emergency vehicle units with greater workload to the higher priority posts is penalized. That is, units with lower workload should be given preference to go to the higher priority posts; and If an emergency vehicle unit is due for a meal-break, there is penalty for not deploying the unit to a meal dedicated post.

The list of weighted deployment rules may also comprise the following constraints, where a constraint is a rule that must be satisfied:

An emergency vehicle unit can go to only one post at a time;

A post can have 0 or 1 emergency vehicle units associated therewith (where the unit is either deployed or en route);

A specialized emergency vehicle unit cannot go to a low density post (i.e., posts in a rural area);

A single unit (an emergency vehicle unit with one paramedic) cannot go to a post that is not dedicated for single units;

If an emergency vehicle unit is at a post, the unit cannot be assigned to an associated post (two posts are associated posts if they are located nearby and are interchangeable with one another for the purpose of calculating deployment recommendations); and If a post is occupied by a specialized emergency vehicle unit, another specialized emergency vehicle unit cannot replace the currently occupying unit.

The weights associated with each of the weighted deployment rules can, for example, be represented as a real number between 0 and 1 or as a percentage between 0% and 100%. A weight of 1 or 100%, for instance, could represent that the rule is a constraint that must be satisfied. A skilled person would understand that other numeric systems could be used to represent the weights associated with each of the weighted deployment rules.

The method 2000 comprises storing historical data of past deployment in the memory buffer, each past deployment providing a target post from the plurality of posts for one of the plurality of emergency vehicle units and an associated event. The historical data may, for instance, be stored in the memory module of the DCD 1200 or the storage module 1400. The historical data may, for example, relate to the number of emergencies that occurred within a geographical sub-area of the geographical area covered by the system 1000 during the associated event. The historical data may, for example, relate to the time for the emergency vehicle units to reach a target post or to reach the location of an emergency during the associated event. The associated event may be such things as rush hour, weekdays, weekends, holidays, sporting events, concerts, and other large public events. The DCD 1200 may build a bank of historical data over time by tracking the emergency vehicle units through the location data and status information received from the server 1500. The DCD 1200 may alternatively receive the historical data, as well as updates to the historical data, from an external resource, such as the server 1500, a CD-ROM, a DVD, an external hard drive, or some other means for storing and transmitting the historical data.

The method 2000 comprises storing a list of upcoming events for the geographical area in the memory buffer. For example, the list of upcoming events may be stored in the memory module 1220 of the DCD 1200 or in the storage module 1400. The list of upcoming events may include rush hour, weekdays, weekends, holidays, sporting events, concerts, and other large public events. The list of upcoming events permits the DCD 1200 to determine which historical data is relevant based on the event associated with that historical data.

The method 2000 comprises calculating an updated list of priority indicators for each of the plurality of posts based at least on the historical data and the list of upcoming events 2030. Calculating an updated list of priority indicators means assigning different priorities to one or more of the posts. For examples, if the priorities are represented as a rank ordering of the posts (i.e., each post is a assigned a number from 1 to N, where there are N posts), calculating an updated list of priority indicators involves providing a new rank ordering of the posts. For example, if the next upcoming event is rush hour, and according to the historical data associated with the event rush hour, there tend to be more incidents in the geographical sub-area around a particular highway, the DCD 1200 will update the list of priority indicators so that the posts in the geographical area surround the particular highway receive a higher priority than normal.

The method 2000 comprises storing the updated list of priority indicators in the memory buffer. The updated list of priority indicates may, for example, be stored in the memory module 1220 of the DCD 1200 or in the storage module 1400.

The method 2000 comprises calculating a deployment recommendation considering the list of weighted deployment rules, the location data, the status information and the updated list of priority indicators from the memory buffer 2040, the deployment recommendation comprising one or more suggested deployments, each suggested deployment providing a suggested target post from the plurality of posts for one of the plurality of emergency vehicle units. The DCD 1200 may read the list of weighted deployment rules, the location data, the status information and the updated list of priority indicators from the memory module 1220 of the DCD 1200 or from the storage module 1400. The list of weighted deployment rules define an optimization problem in relation to the location data, the status information, and the updated list of priority indicators. For example, the list of weighted deployment rules may define an optimization problem in which the time to arrive at the site of an emergency is minimized. The DCD 1200 uses optimization techniques that would be well-known to a person skilled in the art to solve the optimization problem defined by the list of weighted deployment rules using the parameters provided by the location data, the status information, and the updated list of priority indicators. Alternatively, the DCD 1200 may use an external system or software package to solve the optimization problem. The result of the calculation is a set of pairings between emergency vehicle units and posts, representing the deployment of a particular emergency vehicle unit to a particular post.

The method 2000 comprises, at a computer, sending the deployment recommendation to a user interface module for display 2050. Once the deployment recommendation has been calculated, the DCD 1200 displays this deployment recommendation through the user interface module 1240. The deployment recommendation may be displayed on a display device 1100A that is integrated with the DCD 1200 or on a display device 1100B that is external to the DCD 1200.

Figure 5:
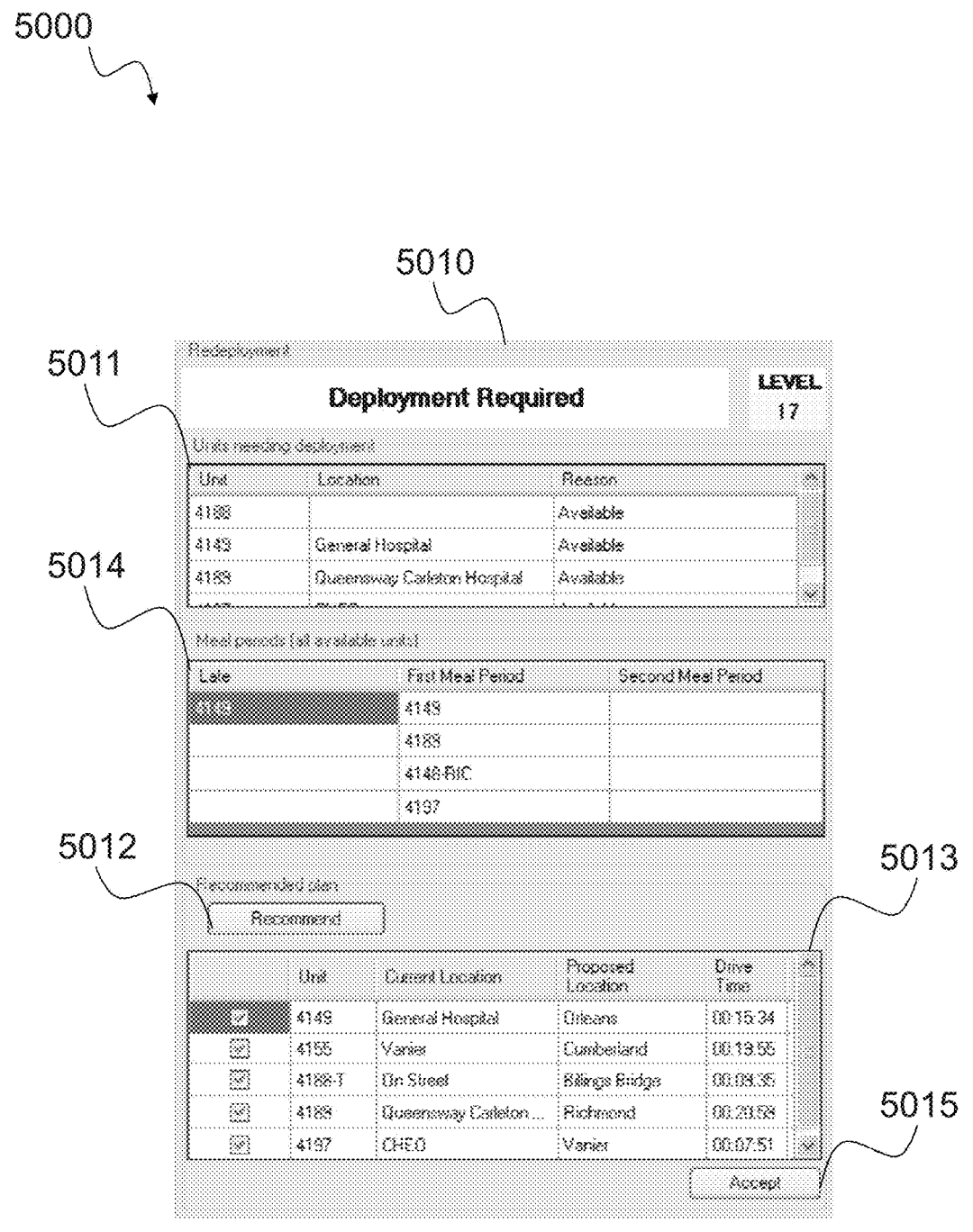
Figure 6:
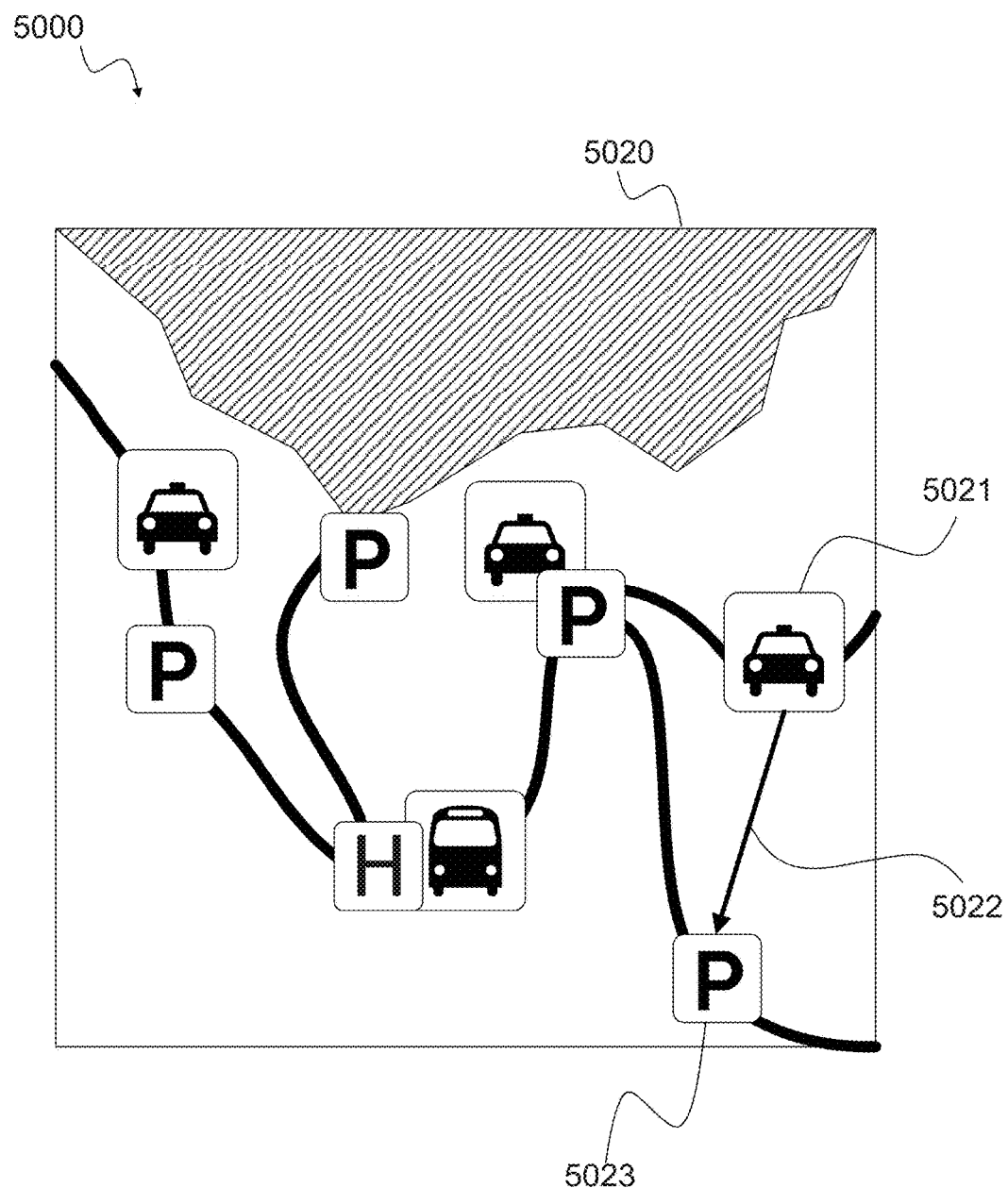
FIG. 6 is an example of the map component of a graphical user interface for an exemplary computing system for deploying emergency vehicle units.

The deployment recommendation may be sent to the display device 1100B over the network 1300 for display. The user interface module 1240 may display the deployment recommendation using text-based interface or using a graphical user interface (GUI). FIGS. 5 and 6 show an exemplary GUI 5000 for an emergency-vehicle-units deployment system. The GUI 5000 comprises a deployment panel 5010 and a map 5020.

As an option, the method 2000, may further comprise, at the computer, receiving an acceptance of the deployment recommendation from the user interface module. The user interface module 1240 of the DCD 1200 may comprise a GUI button 5015, a physical button, or a touch sensitive surface. The user indicates his or her acceptance of the deployment recommendation by clicking this button, pushing the physical button (e.g., a key on a keyboard), or touching the touch sensitive surface. The deployment recommendation may be accepted in whole or in part. In the case of a partial acceptance, the interface module 1240 of the DCD 1200 may display the result of the partial acceptance for the further review and acceptance of the user. The user of the DCD 1200 may then assign emergency vehicle units to posts by communicating with the emergency vehicle units (e.g., by radio, telephone, or text messaging) in accordance with the accepted deployment recommendation. A skilled person would understand that once the deployment recommendation has been accepted, the recommendation becomes a deployment assignment of emergency vehicle units to posts.

As an option, the method 2000 may further comprise, at the computer, sending a list of steps to implement the deployment recommendation to the user interface module for display. Based on the deployment recommendation, the DCD 1200 calculates a number of steps to be performed by the user to implement the deployment recommendation. The implementation steps may include, for example, to communicate with a particular emergency vehicle unit to direct the unit to a particular post. The implementation steps may be displayed on the display device 1100A that is integrated with the DCD 1200 or on the display device 1100B that is external to the DCD 1200. The implementation steps may be sent to the display device 1100B over the network 1300 for display. The user interface module 1240 may display the implementation steps using text-based interface or using a graphical user interface (GUI). The user of the DCD 1200 may then assign emergency vehicle units to posts by communicating with the emergency vehicle units (e.g., by radio, telephone, or text messaging) in accordance with the implementation steps.

As an option, the method 2000 may further comprise, at the computer, receiving a user updated list of priority indicators for each of at least one of the plurality of posts from the user interface module. The user may want to modify the priorities that the DCD 1200 has assigned to the posts, for example, if there is an unexpected event that was not in the list of upcoming events. The user interface module 1240 may provide a means for updating said priorities. For example, the user interface module 1240 may comprise a rank order listing of the posts, where the user may drag and drop the posts into a different order reflecting a different rank order of priority. Alternatively, the user interface module may comprise a map of the physical locations of the posts, where each post on the map has a number representing its priority, which is editable by the user.

As an option, the method 2000 may further comprise, following the acceptance of the deployment recommendation, sending the deployment recommendation to a plurality of mobile computers located at each of the plurality of emergency vehicle units for display. Instead of the user of the DCD 1200 communicating the deployment recommendation to the emergency vehicle units, the DCD 1200 may send the deployment recommendation directly to mobile computers located directly in the emergency vehicle units. The mobile computers may be smart phones, tablets, laptop computers, or a computer system integrated in the emergency vehicle unit. The mobile computers may receive the deployment recommendation from the DCD 1200 through the network 1300. The DCD 1200 may send the entire deployment recommendation to each mobile computer or only the part of the deployment recommendation relevant to that particular emergency vehicle unit. When the mobile computer receives the deployment recommendation, the deployment recommendation is displayed. The deployment recommendation may be displayed in a textual or a graphical format. As an alternative, the deployment recommendation may be communicated using audio, using text-to-speech technology.

Optionally, the user interface module 1240 may display the deployment recommendation in a textual form. The user interface module 1240 may, for example, comprise a standard text-based command-prompt. Alternatively, the interface module may comprise a GUI 5000, which displays the deployment recommendation in a textual format in the deployment pane 5010. For example, the GUI 5000 may comprise a table 5013 where a first column contains identifiers for the emergency vehicle units and a second column contains identifiers for target post for each emergency vehicle unit.

Optionally, the user interface module 1240 displays the deployment recommendation in a graphical form. As a further option, each of the one or more suggested deployments is represented as an arrow from one of the plurality of emergency vehicle units to the suggested target post of the plurality of posts. For example, the user interface module 1240 may comprise map 5020 showing the locations of each of the emergency vehicle units 5021 and the posts 5023. The user interface module 1240 may display the deployment recommendation with arrows 5022 from each of the emergency vehicle units 5021 to their target posts 5023. As a further option, the graphical form may comprise a polygon for representing a geographical sub-area within the geographical area that is reachable by the plurality of emergency vehicle units within a specified time based on the location data, the status information, the historical data, and the list of upcoming events. There may be a requirement that emergency vehicle units reach the location of an emergency within a specified time (e.g., 10 minutes) of being dispatched. The user of the system 1000 will therefore want to be able to see at a glance which parts of the map are currently covered and whether there are any gaps. The DCD 1200 may calculate the geographical sub-area that is reachable by the emergency vehicle units within a specified period of time. The user interface module 1240 may then represent this geographical sub-area using a polygon. A single polygon may be generated to represent the area that is covered by all the emergency vehicle units combined. Alternatively, a separate polygon may be generated for each emergency vehicle unit. As another alternative, the DCD 1200 may receive the geographical sub-area that is reachable by the emergency vehicle units within a specified period of time from an external resource, such as the server 1500.

Optionally, the system 1000 wherein the network further comprises a plurality of unit computers associated to each of the plurality of emergency vehicle units, and wherein the at least one server 1500 receives the location data and status information for each of the plurality of emergency vehicle units from the unit computers through the network 1300. The unit computers may be mobile computers (e.g., smart phone, tablet, laptop) located in the emergency vehicle unit. The unit computer may also be a computer integrated with the emergency vehicle unit. The unit computers may automatically determine the location data using a Global Positioning System. Alternatively, the location data, as well as the status information, may be manually entered. The server 1500 then receives the location data and status information from the plurality of unit computers through the network 1300.

Optionally, the system 1000 wherein the computer 1200 sends the deployment recommendation to the plurality of unit computers through the network 1300 for display. Instead of the user of the DCD 1200 communicating the deployment recommendation to the emergency vehicle units, the DCD 1200 may send the deployment recommendation directly to the unit computers located directly in the emergency vehicle units. The unit computers may receive the deployment recommendation from the DCD 1200 through the network 1300. The DCD 1200 may send the entire deployment recommendation to each unit computer or only the part of the deployment recommendation relevant to that particular emergency vehicle unit. When the unit computer receives the deployment recommendation, the deployment recommendation is displayed. The deployment recommendation may be displayed in a textual or a graphical format. As an alternative, the deployment recommendation may be communicated using audio, using text-to-speech technology.

As an option, the system 1000 wherein the at least one server 1500 is a plurality of servers 1500 associated to each of the plurality of emergency vehicle units. Each of the plurality of servers 1500 may be mobile computers (e.g., smart phone, tablet, or laptop) located in the emergency vehicle units. The plurality of servers 1500 may also be a computer integrated with the emergency vehicle unit. The plurality of servers 1500 may automatically determine the location data using a Global Positioning System. Alternatively, the location data, as well as the status information, may be manually entered. The DCD 1200 receives the location data and status information from the plurality of servers 1500 through the network 1300.

As an option, the system 1000 wherein the network 1300 further comprises one or more client computers, and wherein the DCD 1200 sends the deployment recommendation to the one or more client computers for display. In the preferred embodiment, the one or more client computers are desktop computers. Alternatively, the one or more client computers are mobile computers (e.g., smart phone, tablet, laptop). This permits multiple users to use the DCD 1200 system simultaneously in different physical locations. A user may request a deployment recommendation from one of the client computers, and the deployment recommendation may be sent to the DCD 1200 through the network 1300. A user may accept a deployment recommendation from one of the client computers, and the deployment recommendation may be sent to the DCD 1200 through the network 1300. The interface module 1240 of the DCD 1200 may graphically render the deployment recommendation prior to sending the recommendation to the client computers through the network 1300. Alternatively, the DCD 1200 may send the deployment recommendation as data to the client computers through the network 1300, where an interface module of the client computers graphically renders and displays the deployment recommendation on a display device of the client computers.

Optionally, the system 1000 wherein the system 1000 comprises a plurality of display devices 1100B connected to the DCD 1200 through the network 1300. The DCD 1200 sends the GUI rendered by the user interface module 1240 for display on the plurality of display devices 1100B through the network 1300. Each display device 1100B may provide the same or different GUI. Each display device 1100B may display the same GUI with the same data. Alternatively, each display device 1100B may display the same GUI with different data. As another alternative, each display device 1100B may display a different GUI with either the same or different data. This provides another means for permitting multiple users to simultaneously use the DCD 1200 in different locations. In particular, the DCD 1200 may send a deployment recommendation for display to the display devices 1100B through the network 1300. A user may request a deployment recommendation from the display device 1100B and send the request to the DCD 1200 through the network 1300. A user may accept a deployment recommendation from the display device 1100B and send the acceptance to the DCD 1200 through the network 1200.

Optionally, the system 1000 wherein the at least one server 1500 is a plurality of servers 1500. The DCD 1200 may receive the same types of information from each of the plurality of servers 1500, where having a plurality of servers 1500 is for the purpose, for instance, of redundancy and efficiency. Alternatively, the DCD 1200 may receive different types of information from each of the plurality of servers 1500. For example, the plurality of servers 1500 may comprise two servers 1500, wherein the DCD 1200 receives location data from a first of the two servers 1500, and the DCD 1200 receives status information from a second of the two servers 1500.

Reference is now made concurrently to FIG. 1 and FIG. 3, which shows a flow chart of an exemplary method 3000 of a second set of embodiments for calculating weighted deployment rules in an emergency-vehicle-units deployment system for a geographical area. The method 3000 comprises receiving, from at least one external resource, location data and status information for each of a plurality of emergency vehicle units 3010. The location data and status information are received at the DCD 1200. The external resource may be a server 1500 connected to the DCD 1200 through the network 1300, where the DCD 1200 receives the location data and status information from the server 1500 through the network 1300. The status information for each of the emergency vehicle units may include such information as whether the unit is active, shift schedules (i.e., start of shift and end of shift time), unit attributes (e.g., regular units, specialized units), unit assignment to low-density or high-density areas, unit's availability for deployment, and the post the unit is at or assigned to. A specialized unit is an emergency vehicle unit where the crew and/or the vehicle have special attributes. For example, specialized units may include: an emergency vehicle unit that is in training mode, an emergency vehicle unit wherein one or more of its crew are students, an emergency vehicle unit that has a single crew member, an emergency vehicle unit that is a car, an emergency vehicle unit that is an ambulance for handling chemical spills. The status information may also include information about meal periods (e.g., time window when unit requires a meal period, time when unit is on meal period, completed meal periods, and missed meal periods), number of deployments per unit per shift, cumulative kilometers driven in a shift, idle time at a location, the number of times a unit has been rerouted before reaching a post, and the time a unit has been on route to a destination. This information may also be calculated and/or tracked by the DCD 1200 rather than received as status information from the server 1500. The DCD 1200 and the server 1500 may communicate using TCP/IP and Ethernet or ATM SONET/SDNET over air, copper wires, optical fiber, or any other physical support capable of carrying data. Skilled persons will readily understand that many different network protocols could be used without affecting the functioning of the invention. The network 1300 may be the Internet or other wide area network. The network 1300 may also be a local area network. The location data and status information may be in a textual format (e.g., XML or JSON) or a binary format. The location data and status information may be manually inputted into the DCD 1200. The DCD 1200 may receive the location data and status information continuously in real-time. Alternatively, the DCD 1200 may receive the location data and status information periodically (e.g., every five minutes). As a further alternative, the DCD 1200 may receive the location data and status information only when the user requests a deployment recommendation.

The method 3000 comprises storing location data and status information for each of the plurality of emergency vehicle units in a memory buffer 3020. For example, the location data and status information may be stored in the memory module 1220 of the DCD 1200. Alternatively, the location data and status information may be stored in the storage module 1400.

The method 3000 comprises storing a list of priority indicators associated to each of a plurality of posts in the memory buffer. For instance, the list of priority indicators associated to each of the plurality of posts may be stored in the memory module 1220 of the DCD 1200, or they may be stored in the storage module 1400. The list of priority indicators comprise a priority for each of the posts. The priority is used by the DCD 1200 when calculating a deployment of emergency vehicle units to posts. For example, a post with a higher priority than another post will, other things being equal, receive an emergency vehicle unit faster than the post with the lower priority. The priorities of the posts may be represented using an ordered ranking. That is, if there are N posts, each post receives a unique priority number between 1 and N, where the post with priority N has the highest priority, and the post with the priority 1 has the lowest priority, or vice versa. A skilled person will understand that there are many other means for representing the relative priorities of the posts.

The method 3000 comprises storing in the memory buffer a list of weighted deployment rules for deploying the plurality of emergency vehicle units to the plurality of posts. For example, the list of weighted deployment rules may be stored in the memory module 1220 of the DCD 1200 or in the storage module 1400. The list of weighted deployment rules may comprise the following rules:

The total travel time should be minimized. The travel time when emergency vehicle units go to their posts should be as little as possible;

If an emergency vehicle unit is already at a post, its redeployment is penalized. The penalty is greatest for the first 10 minutes (after arrival to the current post); then the penalty is less if the arrival time is 10-30 minutes ago; and the penalty is smallest if after 30 minutes;

The drive time to posts with higher priority should be minimized. The higher the priority the greater the penalty for the estimate arrival time duration;

If an emergency vehicle unit is en route to a post, its rerouting to another post is penalized; and the second (and following) rerouting is penalized even more;

If an emergency vehicle unit is at a meal dedicated post (i.e., a post with a kitchen) and has a meal-in-progress status, its redeployment is penalized. Penalty depends on the time in the meal break, and number of meal break (i.e., first or second);

Deploying a low density unit far from its starting rural post is penalized. The greater the drive time to the starting post the greater the penalty;

Deploying a high density unit far from headquarters within the last 60 minutes of its shift is penalized. The longer the drive time the greater the penalty;

Deploying a specialized emergency vehicle unit to a post that is not explicitly dedicated for specialized units is penalized;

Assigning emergency vehicle units with greater workload to the higher priority posts is penalized. That is, units with lower workload should be given preference to go to the higher priority posts; and If an emergency vehicle unit is due for a meal-break, there is penalty for not deploying the unit to a meal dedicated post.

The list of weighted deployment rules may also comprise the following constraints, where a constraint is a rule that must be satisfied:

An emergency vehicle unit can go to only one post at a time;

A post can have 0 or 1 emergency vehicle units associated therewith (where the unit is either deployed or en route);

A specialized emergency vehicle unit cannot go to a low density post (i.e., posts in a rural area);

A single unit (an emergency vehicle unit with one paramedic) cannot go to a post that is not dedicated for single units;

If an emergency vehicle unit is at a post, the unit cannot be assigned to an associated post (two posts are associated posts if they are located nearby and are interchangeable with one another for the purpose of calculating deployment recommendations); and If a post is occupied by a specialized emergency vehicle unit, another specialized emergency vehicle unit cannot replace the currently occupying unit. The weights associated with each of the weighted deployment rules can, for example, be represented as a real number between 0 and 1 or as a percentage between 0% and 100%. A weight of 1 or 100%, for instance, could represent that the rule is a constraint that must be satisfied. A skilled person would understand that other numeric systems could be used to represent the weights associated with each of the weighted deployment rules.

The method 3000 comprises applying a deployment calculation formula for calculating a deployment recommendation considering the list of weighted deployment rules, the location data, the status information and the list of priority indicators from the memory buffer 3030, the deployment recommendation comprising one or more suggested deployments, each suggested deployment providing a suggested target post from the plurality of posts for one of the plurality of emergency vehicle units. The DCD 1200 may read the list of weighted deployment rules, the location data, the status information and the list of priority indicators from the memory module 1220 of the DCD 1200 or from the storage module 1400. The list of weighted deployment rules define an optimization problem in relation to the location data, the status information, and the updated list of priority indicators. For example, the list of weighted deployment rules may define an optimization problem in which the time to arrive at the site of an emergency is minimized. The DCD 1200 uses optimization techniques that would be well-known to a person skilled in the art to solve the optimization problem defined by the list of weighted deployment rules using the parameters provided by the location data, the status information, and the list of priority indicators. Alternatively, the DCD 1200 may use an external system or software package to solve the optimization problem. The result of the calculation is a set of pairings between emergency vehicle units and posts, representing the deployment of a particular emergency vehicle unit to a particular post.

The method 3000 comprises, at the computer, sending the deployment recommendation to a user interface module for display 3040. Once the DCD 1200 has calculated the deployment recommendation, the deployment recommendation is displayed through the user interface module 1240. The deployment recommendation may be displayed on a display device 1100A that is integrated with the DCD 1200 or on a display device 1100B that is external to the DCD 1200. The deployment recommendation may be sent to the display device 1100B over the network 1300 for display. The user interface module 1240 may display the deployment recommendation using text-based interface or using a graphical user interface (GUI). FIGS. 5 and 6 show an exemplary GUI 5000 for an emergency-vehicle-units deployment system. The GUI 5000 comprises a deployment panel 5010 and a map 5020.

The method 3000 comprises, at the computer, receiving an updated deployment recommendation from the user interface module 3050. The user may use the text-based interface or GUI to modify the deployment recommendation. At least one of the suggested deployments of the updated deployment recommendation may be different from the corresponding suggested deployment of the deployment recommendation calculated by the DCD 1200. If the deployment recommendation is displayed in a table (e.g., a first column indicates the emergency vehicle unit and a second column indicates the target post), the user may, for example, modify the deployment recommendation by modifying the target post column. Alternatively, the GUI may provide a drag-and-drop interface for modifying the deployment recommendation. For example, if the deployment recommendation is displayed on a map with arrows between the emergency vehicle units and the posts, the user may be able to modify the deployment recommendation by dragging and dropping the arrows between different emergency vehicle units and posts. The user may then save the updated deployment recommendation. For example, there may be a "Save" or "Submit" button. Alternatively, the updated deployment recommendation may be saved every time the user makes a change to the deployment. Receipt of the updated deployment recommendation from the user interface module 1240 may in itself indicate the user's acceptance of the updated deployment recommendation. Alternatively, there may be a further step of acceptance (e.g., the clicking of an "Accept" button). A skilled person would understand that once the updated deployment recommendation has been accepted, the recommendation becomes a deployment assignment.

The method 3000 comprises, at the computer, sending the updated deployment recommendation to the user interface module for display 3060. The deployment recommendation may be displayed on a display device 1100A that is integrated with the DCD 1200 or on a display device 1100B that is external to the DCD 1200. The deployment recommendation may be sent to the display device 1100B over the network 1300 for display. The user interface module 1240 may display the deployment recommendation using text-based interface or using a graphical user interface (GUI).

The method 3000 comprises calculating an updated list of weighted deployment rules in order for the deployment calculation formula to provide a new deployment recommendation considering the updated list of weighted deployment rules, new location data, new status information and a new list of priority indicators 3070. Overriding the deployment recommendation engages the system training mode. The system training mode may be automatically engaged when the user modifies the deployment recommendation. Alternatively, the system training mode may be automatically engaged when the user saves the updated deployment recommendation. In the system training mode, the DCD 1200 uses the updated deployment recommendation provided by the user to modify the weights of the list of weighted deployment rules so that future deployment recommendations will more closely resemble the deployment recommendations desired by the user. That is, the DCD 1200 learns how to make better deployment recommendations based on the updated deployment recommendations entered by the user. The DCD 1200 uses standard methods from the field of artificial intelligence to train itself that would be familiar to a person skilled in the art. The updated list of weighted deployment rules may be used to provide deployment recommendations in the future to the same user, so that the user is provided with deployment recommendations that more closely resemble their preferences.

The method 3000, at the computer, sending the new deployment recommendation to the user interface module for display. The deployment recommendation may be displayed on a display device 1100A that is integrated with the DCD 1200 or on a display device 1100B that is external to the DCD 1200. The deployment recommendation may be sent to the display device 1100B over the network 1300 for display. The user interface module 1240 may display the deployment recommendation using text-based interface or using a graphical user interface (GUI).

Optionally, the method 3000 wherein a first user inputs the updated deployment recommendation, and a second user views the new deployment recommendation. The updated list of weighted deployment rules may provide deployment recommendations to a different user from the one that entered the updated deployment recommendation. For example, the updated list of weighted deployment rules may be generated from the updated deployment recommendation of an expert user, and the updated list of weighted deployment rules may be used to provide deployment recommendations to one or more junior users. That is, the DCD 1200 may trained using the choices of an expert user for the benefit of junior users so that the junior users can learn from the expert users.

As an option, the method 3000 may further comprise, at the computer, sending a list of steps to implement the deployment recommendation to the user interface module for display. Based on the deployment recommendation, the DCD 1200 calculates a number of steps to be performed by the user to implement the deployment recommendation. The implementation steps may include, for example, to communicate with a particular emergency vehicle unit to direct the unit to a particular post. The implementation steps may be displayed on the display device 1100A that is integrated with the DCD 1200 or on the display device 1100B that is external to the DCD 1200. The implementation step may be sent to the display device 1100B over the network 1300 for display. The user interface module 1240 may display the implementation steps using text-based interface or using a graphical user interface (GUI).

As an option, the method 3000 may further comprise, at the computer, receiving a user updated list of weighted deployment rules from the user interface module to provide the new deployment recommendation considering the user updated list of weighted deployment rules, the new location data, the new status information and the new list of priority indicators. The user may want to modify the weights associated with the rules of the list of weighted deployment rules. For example, the user may believe that the DCD 1200 may provide better deployment recommendations with a different set of weights than the ones calculated by the DCD 1200. The user interface module 1240 may provide a means for updating said weights. For example, the user interface module 1240 may comprise table mapping deployment rules to weights that permits the user update the weights associated to each of the rules. The user interface module 1240 may also permit the user to add, remove, and edit the deployment rules.

As an option, the method 3000 may further comprise, sending the deployment recommendation to a plurality of mobile computers located at each of the plurality of emergency vehicle units for display. Instead of the user of the DCD 1200 communicating the deployment recommendation to the emergency vehicle units, the DCD 1200 may send the deployment recommendation directly to mobile computers located directly in the emergency vehicle units. The mobile computers may be smart phones, tablets, laptop computers, or a computer system integrated in the emergency vehicle unit. The mobile computers may receive the deployment recommendation from the DCD 1200 through the network 1300. The DCD 1200 may send the entire deployment recommendation to each mobile computer or only the part of the deployment recommendation relevant to that particular emergency vehicle unit. When the mobile computer receives the deployment recommendation, the deployment recommendation is displayed. The deployment recommendation may be displayed in a textual or a graphical format. As an alternative, the deployment recommendation may be communicated using audio, using text-to-speech technology.

Optionally, the user interface module 1240 may display the deployment recommendation in a textual form. The user interface module 1240 may, for example, comprise a standard text-based command-prompt. Alternatively, the interface module may comprise a GUI 5000, which displays the deployment recommendation in a textual format in the deployment pane 5010. For example, the GUI 5000 may comprise a table 5013 where a first column contains identifiers for the emergency vehicle units and a second column contains identifiers for target post for each emergency vehicle unit.

Optionally, the user interface module 1240 displays the deployment recommendation in a graphical form. As a further option, each of the one or more suggested deployments is represented as an arrow from one of the plurality of emergency vehicle units to the suggested target post of the plurality of posts. For example, the user interface module 1240 may comprise map 5020 showing the locations of each of the emergency vehicle units 5021 and the posts 5023. The user interface module 1240 may display the deployment recommendation with arrows 5022 from each of the emergency vehicle units 5021 to their target posts 5023. As a further option, the graphical form may comprise a polygon for representing a geographical sub-area within the geographical area that is reachable by the plurality of emergency vehicle units within a specified time based on the location data, the status information, the historical data, and the list of upcoming events. There may be a requirement that emergency vehicle units reach the location of an emergency within a specified time (e.g., 10 minutes) of being dispatched. The user of the system 1000 will therefore want to be able to see at a glance which parts of the map are currently covered and whether there are any gaps. The DCD 1200 may calculate the geographical sub-area that is reachable by the emergency vehicle units within a specified period of time. The user interface module 1240 may then represent this geographical sub-area using a polygon. A single polygon may be generated to represent the area that is covered by all the emergency vehicle units combined. Alternatively, a separate polygon may be generated for each emergency vehicle unit. As another alternative, the DCD 1200 may receive the geographical sub-area that is reachable by the emergency vehicle units within a specified period of time from an external resource, such as the server 1500.

Optionally, the system 1000 wherein the network further comprises a plurality of unit computers associated to each of the plurality of emergency vehicle units, and wherein the at least one server 1500 receives the location data and status information for each of the plurality of emergency vehicle units from the unit computers through the network 1300. The unit computers may be mobile computers (e.g., smart phone, tablet, laptop) located in the emergency vehicle unit. The unit computer may also be a computer integrated with the emergency vehicle unit. The unit computers may automatically determine the location data using a Global Positioning System. Alternatively, the location data, as well as the status information, may be manually entered. The server 1500 then receives the location data and status information from the plurality of unit computers through the network 1300.

Optionally, the system 1000 wherein the computer 1200 sends the updated deployment recommendation to the plurality of unit computers through the network 1300 for display. Instead of the user of the DCD 1200 communicating the deployment recommendation to the emergency vehicle units, the DCD 1200 may send the updated deployment recommendation directly to the unit computers located directly in the emergency vehicle units. The unit computers may receive the updated deployment recommendation from the DCD 1200 through the network 1300. The DCD 1200 may send the entire updated deployment recommendation to each unit computer or only the part of the updated deployment recommendation relevant to that particular emergency vehicle unit. When the unit computer receives the updated deployment recommendation, the updated deployment recommendation is displayed. The updated deployment recommendation may be displayed in a textual or a graphical format. As an alternative, the updated deployment recommendation may be communicated using audio, using text-to-speech technology.

As an option, the system 1000 wherein the at least one server 1500 is a plurality of servers 1500 associated to each of the plurality of emergency vehicle units. Each of the plurality of servers 1500 may be mobile computers (e.g., smart phone, tablet, or laptop) located in the emergency vehicle units. The plurality of servers 1500 may also be a computer integrated with the emergency vehicle unit. The plurality of servers 1500 may automatically determine the location data using a Global Positioning System. Alternatively, the location data, as well as the status information, may be manually entered. The DCD 1200 receives the location data and status information from the plurality of servers 1500 through the network 1300.

As an option, the system 1000 wherein the network 1300 further comprises one or more client computers, and wherein the DCD 1200 sends the updated deployment recommendation to the one or more client computers for display. In the preferred embodiment, the one or more client computers are desktop computers. Alternatively, the one or more client computers are mobile computers (e.g., smart phone, tablet, laptop). This permits multiple users to use the DCD 1200 system simultaneously in different physical locations. A user may request a deployment recommendation from one of the client computers, and the updated deployment recommendation may be sent to the DCD 1200 through the network 1300. A user may accept a deployment recommendation from one of the client computers, and the updated deployment recommendation may be sent to the DCD 1200 through the network 1300. The interface module 1240 of the DCD 1200 may graphically render the updated deployment recommendation prior to sending the updated recommendation to the client computers through the network 1300.

Alternatively, the DCD 1200 may send the updated deployment recommendation as data to the client computers through the network 1300, where an interface module of the client computers graphically renders and displays the updated deployment recommendation on a display device of the client computers.

Optionally, the system 1000 wherein the system 1000 comprises a plurality of display devices 1100B connected to the DCD 1200 through the network 1300. The DCD 1200 send the GUI rendered by the user interface module 1240 for display on the plurality of display devices 1100B through the network 1300. Each display device 1100B may provide the same or different GUI. Each display device 1100B may display the same GUI with the same data. Alternatively, each display device 1100B may display the same GUI with different data. As another alternative, each display device 1100B may display a different GUI with either the same or different data. This provides another means for permitting multiple users to simultaneously use the DCD 1200 in different locations. In particular, the DCD 1200 may send an updated deployment recommendation for display to the display devices 1100B through the network 1300. A user may request a deployment recommendation from the display device 1100B and send the request to the DCD 1200 through the network 1300. A user may accept a deployment recommendation from the display device 1100B and send the acceptance to the DCD 1200 through the network 1300.

Optionally, the system 1000 wherein the at least one server 1500 is a plurality of servers 1500. The DCD 1200 may receive the same types of information from each of the plurality of servers 1500, where having a plurality of servers 1500 is for the purpose, for instance, of redundancy and efficiency. Alternatively, the DCD 1200 may receive different types of information from each of the plurality of servers 1500. For example, the plurality of servers 1500 may comprise two servers 1500, wherein the DCD 1200 receives location data from a first of the two servers 1500, and the DCD 1200 receives status information from a second of the two servers 1500.

Figure 4:
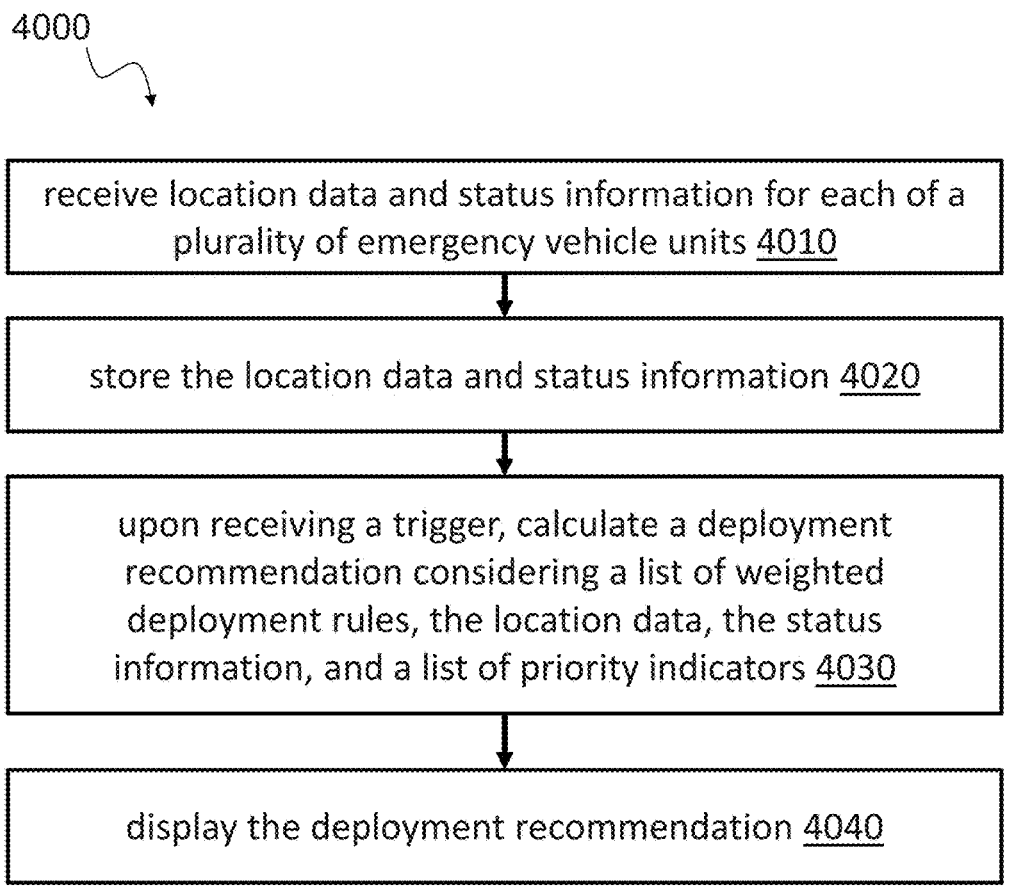
FIG. 4 is a flow chart of an exemplary method of a third set of embodiments for continuously recommending a deployment of emergency vehicle units towards one or more of a plurality of posts.

Reference is now made concurrently to FIG. 1 and FIG. 4, which shows a flow chart of an exemplary method 4000 of a third set of embodiments for continuously recommending a deployment of emergency vehicle units towards one or more of a plurality of posts. The method 4000 comprises receiving, from at least one external resource, location data and status information for each of a plurality of emergency vehicle units 4010. The location data and status information are received at the DCD 1200. The external resource may be a server 1500 connected to the DCD 1200 through the network 1300, where the DCD 1200 receives the location data and status information from the server 1500 through the network 1300. The status information for each of the emergency vehicle units may include such information as whether the unit is active, shift schedules (i.e., start of shift and end of shift time), unit attributes (e.g., regular units, specialized units), unit assignment to low-density or high-density areas, unit's availability for deployment, and the post the unit is at or assigned to. A specialized unit is an emergency vehicle unit where the crew and/or the vehicle have special attributes. For example, specialized units may include: an emergency vehicle unit that is in training mode, an emergency vehicle unit wherein one or more of its crew are students, an emergency vehicle unit that has a single crew member, an emergency vehicle unit that is a car, an emergency vehicle unit that is an ambulance for handling chemical spills. The status information may also include information about meal periods (e.g., time window when unit requires a meal period, time when unit is on meal period, completed meal periods, and missed meal periods), number of deployments per unit per shift, cumulative kilometers driven in a shift, idle time at a location, the number of times a unit has been rerouted before reaching a post, and the time a unit has been on route to a destination. This information may also be calculated and/or tracked by the DCD 1200 rather than received as status information from the server 1500. The DCD 1200 and the server 1500 may communicate using TCP/IP and Ethernet or ATM SONET/SDNET over air, copper wires, optical fiber, or any other physical support capable of carrying data. Skilled persons will readily understand that many different network protocols could be used without affecting the functioning of the invention. The network 1300 may be the Internet or other wide area network. The network 1300 may also be a local area network. The location data and status information may be in a textual format (e.g., XML or JSON) or a binary format. The location data and status information may be manually inputted into the DCD 1200. The DCD 1200 may receive the location data and status information continuously in real-time. Alternatively, the DCD 1200 may receive the location data and status information periodically (e.g., every five minutes). As a further alternative, the DCD 1200 may receive the location data and status information only when the user requests a deployment recommendation.

The method 4000 comprises storing location data and status information for each of the plurality of emergency vehicle units in a memory buffer 4020. For example, the location data and status information may be stored in the memory module 1220 of the DCD 1200. Alternatively, the location data and status information may be stored in the storage module 1400.

The method 4000 comprises storing a list of priority indicators associated to each of a plurality of posts in the memory buffer. For instance, the list of priority indicators associated to each of the plurality of posts may be stored in the memory module 1220 of the DCD 1200, or they may be stored in the storage module 1400. The list of priority indicators comprise a priority for each of the posts. The priority is used by the DCD 1200 when calculating a deployment of emergency vehicle units to posts. For example, a post with a higher priority than another post will, other things being equal, receive an emergency vehicle unit faster than the post with the lower priority. The priorities of the posts may be represented using an ordered ranking. That is, if there are N posts, each post receives a unique priority number between 1 and N, where the post with priority N has the highest priority, and the post with the priority 1 has the lowest priority, or vice versa. A skilled person will understand that there are many other means for representing the relative priorities of the posts.

and end of shift time), unit attributes (e.g., regular units, specialized units), unit deployment rules for deploying the plurality of emergency vehicle units to the plurality of posts. For example, the list of weighted deployment rules may be stored in the memory module 1220 of the DCD 1200 or in the storage module 1400. The list of weighted deployment rules may comprise the following rules:

The total travel time should be minimized. The travel time when emergency vehicle units go to their posts should be as little as possible;

If an emergency vehicle unit is already at a post, its redeployment is penalized. The penalty is greatest for the first 10 minutes (after arrival to the current post); then the penalty is less if the arrival time is 10-30 minutes ago; and the penalty is smallest if after 30 minutes;

The drive time to posts with higher priority should be minimized. The higher the priority the greater the penalty for the estimate arrival time duration;

If an emergency vehicle unit is en route to a post, its rerouting to another post is penalized; and the second (and following) rerouting is penalized even more;

If an emergency vehicle unit is at a meal dedicated post (i.e., a post with a kitchen) and has a meal-in-progress status, its redeployment is penalized. Penalty depends on the time in the meal break, and number of meal break (i.e., first or second);

Deploying a low density unit far from its starting rural post is penalized. The greater the drive time to the starting post the greater the penalty;

Deploying a high density unit far from headquarters within the last 60 minutes of its shift is penalized. The longer the drive time the greater the penalty;

Deploying a specialized emergency vehicle unit to a post that is not explicitly dedicated for specialized units is penalized;

Assigning emergency vehicle units with greater workload to the higher priority posts is penalized. That is, units with lower workload should be given preference to go to the higher priority posts; and If an emergency vehicle unit is due for a meal-break, there is penalty for not deploying the unit to a meal dedicated post.

The list of weighted deployment rules may also comprise the following constraints, where a constraint is a rule that must be satisfied:

An emergency vehicle unit can go to only one post at a time;

A post can have 0 or 1 emergency vehicle units associated therewith (where the unit is either deployed or en route);

A specialized emergency vehicle unit cannot go to a low density post (i.e., posts in a rural area);

A single unit (an emergency vehicle unit with one paramedic) cannot go to a post that is not dedicated for single units;

If an emergency vehicle unit is at a post, the unit cannot be assigned to an associated post (two posts are associated posts if they are located nearby and are interchangeable with one another for the purpose of calculating deployment recommendations); and If a post is occupied by a specialized emergency vehicle unit, another specialized emergency vehicle unit cannot replace the currently occupying unit.

The weights associated with each of the weighted deployment rules can, for example, be represented as a real number between 0 and 1 or as a percentage between 0% and 100%. A weight of 1 or 100%, for instance, could represent that the rule is a constraint that must be satisfied. A skilled person would understand that other numeric systems could be used to represent the weights associated with each of the weighted deployment rules.

The method 4000 comprises, upon receiving a trigger, calculating a deployment recommendation considering the list of weighted deployment rules, the location data, the status information and the list of priority indicators from the memory buffer 4030, the deployment recommendation comprising one or more suggested deployments, each suggested deployment providing a suggested target post from the plurality of posts for one of the plurality of emergency vehicle units. The DCD 1200 may read the list of weighted deployment rules, the location data, the status information and the list of priority indicators from the memory module 1220 of the DCD 1200 or from the storage module 1400. The list of weighted deployment rules define an optimization problem in relation to the location data, the status information, and the list of priority indicators. For example, the list of weighted deployment rules may define an optimization problem in which the time to arrive at the site of an emergency is minimized. The DCD 1200 uses optimization techniques that would be well-known to a person skilled in the art to solve the optimization problem defined by the list of weighted deployment rules using the parameters provided by the location data, the status information, and the list of priority indicators. Alternatively, the DCD 1200 may use an external system or software package to solve the optimization problem. The result of the calculation is a set of pairings between emergency vehicle units and posts, representing the deployment of a particular emergency vehicle unit to a particular post.

The method 4000 comprises, at a computer, sending the deployment recommendation to a user interface module for display 4040. Once the DCD 1200 has calculated the deployment recommendation, the deployment recommendation is displayed through the user interface module 1240. The deployment recommendation may be displayed on a display device 1100A that is integrated with the DCD 1200 or on a display device 1100B that is external to the DCD 1200. The deployment recommendation may be sent to the display device 1100B over the network 1300 for display. The user interface module 1240 may display the deployment recommendation using text-based interface or using a graphical user interface (GUI). FIGS. 5 and 6 show an exemplary GUI 5000 for an emergency-vehicle-units deployment system. The GUI 5000 comprises a deployment panel 5010 and a map 5020. The user of the DCD 1200 may then assign emergency vehicle units to posts by communicating with the emergency vehicle units (e.g., by radio, telephone, or text messaging). As the user assigns emergency vehicle units to posts, the user sequentially accepts the deployment recommendation. The sequential acceptance of the deployment recommendation may be entered in the user interface module 1240 of the DCD 1200. Alternatively, the sequential acceptance of the deployment recommendation may be entered in a separate computer system that is connected to the DCD 1200 through the network 1300. A skilled person would understand that as the user sequentially accepts the deployment recommendation, each accepted recommendation becomes a deployment assignment.

As an option, the method 4000 may further comprise sending the deployment recommendation to a plurality of mobile computers located at each of the plurality of emergency vehicle units for display. Instead of the user of the DCD 1200 communicating the deployment recommendation to the emergency vehicle units, after the user accepts the deployment recommendation (e.g., by clicking an "Accept" button), the DCD 1200 may send the deployment recommendation directly to mobile computers located directly in the emergency vehicle units. The mobile computers may be smart phones, tablets, laptop computers, or a computer system integrated in the emergency vehicle unit. The mobile computers may receive the deployment recommendation from the DCD 1200 through the network 1300. The DCD 1200 may send the entire deployment recommendation to each mobile computer or only the part of the deployment recommendation relevant to that particular emergency vehicle unit. When the mobile computer receives the deployment recommendation, the deployment recommendation is displayed. The deployment recommendation may be displayed in a textual or a graphical format. As an alternative, the deployment recommendation may be communicated using audio, using text-to-speech technology.

Optionally, the user interface module 1240 may display the deployment recommendation in a textual form. The user interface module 1240 may, for example, comprise a standard text-based command-prompt. Alternatively, the interface module may comprise a GUI 5000, which displays the deployment recommendation in a textual format in the deployment pane 5010. For example, the GUI 5000 may comprise a table 5013 where a first column contains identifiers for the emergency vehicle units and a second column contains identifiers for target post for each emergency vehicle unit.

Optionally, the user interface module 1240 displays the deployment recommendation in a graphical form. As a further option, each of the one or more suggested deployments is represented as an arrow from one of the plurality of emergency vehicle units to the suggested target post of the plurality of posts. For example, the user interface module 1240 may comprise map 5020 showing the locations of each of the emergency vehicle units 5021 and the posts 5023. The user interface module 1240 may display the deployment recommendation with arrows 5022 from each of the emergency vehicle units 5021 to their target posts 5023. As a further option, the graphical form may comprise a polygon for representing a geographical sub-area within the geographical area that is reachable by the plurality of emergency vehicle units within a specified time based on the location data, the status information, the historical data, and the list of upcoming events. There may be a requirement that emergency vehicle units reach the location of an emergency within a specified time (e.g., 10 minutes) of being dispatched. The user of the system 1000 will therefore want to be able to see at a glance which parts of the map are currently covered and whether there are any gaps. The DCD 1200 may calculate the geographical sub-area that is reachable by the emergency vehicle units within a specified period of time. The user interface module 1240 may then represent this geographical sub-area using a polygon. A single polygon may be generated to represent the area that is covered by all the emergency vehicle units combined. Alternatively, a separate polygon may be generated for each emergency vehicle unit. As another alternative, the DCD 1200 may receive the geographical sub-area that is reachable by the emergency vehicle units within a specified period of time from an external resource, such as the server 1500.

Optionally, the method 4000 wherein the trigger is generated periodically with a frequency. As a further option, the method 4000 further comprising receiving the frequency from the user interface module 1240. The trigger may be generated by a clock within or attached to the DCD 1200. When a certain period of time (e.g., 1 minute) elapses on the clock, the clock or the DCD 1200 may generate an event or trigger. This trigger causes the DCD 1200 to calculate a new deployment recommendation. This provides continuous deployment of the emergency vehicle units. The frequency with which the clock generates the triggers may be modified by the user of the DCD 1200 using the user interface module 1240. As an alternative option, the method 4000 wherein the trigger is an external event, including a change in the location data or status information. For example, the DCD 1200 may continuously receive the location data and status information from the server 1500. Whenever an emergency vehicle unit moves a distance greater than some threshold (e.g., 200 m), the DCD 1200 generates the trigger. Alternatively, the trigger may be generated by the server 1500, wherein the DCD 1200 receives the trigger from the server 1500 through the network 1300. The trigger may also be an internal event. For example, the trigger may be generated whenever list of weighted deployment rules or the list of priority indicators is changed. This provides for continuous deployment of the emergency vehicle units, which may ensure that the current deployment recommendation is always based on the latest location data, status information, list of weighted deployment rules, and list of priority indicators. The trigger may also be generated by the user interface module 1240. For example, the trigger may comprise a user clicking a button in the user interface module 1240.

Optionally, the system 1000 wherein the network further comprises a plurality of unit computers associated to each of the plurality of emergency vehicle units, and wherein the at least one server 1500 receives the location data and status information for each of the plurality of emergency vehicle units from the unit computers through the network 1300. The unit computers may be mobile computers (e.g., smart phone, tablet, laptop) located in the emergency vehicle unit. The unit computer may also be a computer integrated with the emergency vehicle unit. The unit computers may automatically determine the location data using a Global Positioning System. Alternatively, the location data, as well as the status information, may be manually entered. The server 1500 then receives the location data and status information from the plurality of unit computers through the network 1300. As a further option, the plurality of unit computers may generate the trigger for calculating the deployment recommendation. The DCD 1200 may receive the trigger from the plurality of unit computers through the network 1300. For example, one of the unit computers may generate a trigger when its associated emergency vehicle unit has moved more than some threshold distance (e.g., 1 km), or when the status of its associated emergency vehicle unit has changed.

Optionally, the system 1000 wherein the computer 1200 sends the deployment recommendation to the plurality of unit computers through the network 1300 for display. Instead of the user of the DCD 1200 communicating the deployment recommendation to the emergency vehicle units, after the user accepts the deployment recommendation (e.g., by clicking an "Accept" button), the DCD 1200 may send the deployment recommendation directly to the unit computers located directly in the emergency vehicle units. The unit computers may receive the deployment recommendation from the DCD 1200 through the network 1300. The DCD 1200 may send the entire deployment recommendation to each unit computer or only the part of the deployment recommendation relevant to that particular emergency vehicle unit. When the unit computer receives the deployment recommendation, the deployment recommendation is displayed. The deployment recommendation may be displayed in a textual or a graphical format. As an alternative, the deployment recommendation may be communicated using audio, using text-to-speech technology.

As an option, the system 1000 wherein the at least one server 1500 is a plurality of servers 1500 associated to each of the plurality of emergency vehicle units. Each of the plurality of servers 1500 may be mobile computers (e.g., smart phone, tablet, or laptop) located in the emergency vehicle units. The plurality of servers 1500 may also be a computer integrated with the emergency vehicle unit. The plurality of servers 1500 may automatically determine the location data using a Global Positioning System. Alternatively, the location data, as well as the status information, may be manually entered. The DCD 1200 receives the location data and status information from the plurality of servers 1500 through the network 1300.

As an option, the system 1000 wherein the network 1300 further comprises one or more client computers, and wherein the DCD 1200 sends the deployment recommendation to the one or more client computers for display. In the preferred embodiment, the one or more client computers are desktop computers. Alternatively, the one or more client computers are mobile computers (e.g., smart phone, tablet, laptop). This permits multiple users to use the DCD 1200 system simultaneously in different physical locations. The interface module 1240 of the DCD 1200 may graphically render the deployment recommendation prior to sending the recommendation to the client computers through the network 1300. Alternatively, the DCD 1200 may send the deployment recommendation as data to the client computers through the network 1300, where an interface module of the client computers graphically renders and displays the deployment recommendation on a display device of the client computers.

Optionally, the system 1000 wherein the system 1000 comprises a plurality of display devices 1100B connected to the DCD 1200 through the network 1300. The DCD 1200 send the GUI rendered by the user interface module 1240 for display on the plurality of display devices 1100B through the network 1300. Each display device 1100B may provide the same or different GUI. Each display device 1100B may display the same GUI with the same data. Alternatively, each display device 1100B may display the same GUI with different data. As another alternative, each display device 1100B may display a different GUI with either the same or different data. This provides another means for permitting multiple users to simultaneously use the DCD 1200 in different physical locations. In particular, the DCD 1200 may send a deployment recommendation for display to the display devices 1100B through the network 1300.

Optionally, the system 1000 wherein the at least one server 1500 is a plurality of servers 1500. The DCD 1200 may receive the same types of information from each of the plurality of servers 1500, where having a plurality of servers 1500 is for the purpose, for instance, of redundancy and efficiency. Alternatively, the DCD 1200 may receive different types of information from each of the plurality of servers 1500. For example, the plurality of servers 1500 may comprise two servers 1500, wherein the DCD 1200 receives location data from a first of the two servers 1500, and the DCD 1200 receives status information from a second of the two servers 1500.

The processor module 1230 may represent a single processor with one or more processor cores or an array of processors, each comprising one or more processor cores. The memory module 1220 may comprise various types of memory (different standardized or kinds of Random Access Memory (RAM) modules, memory cards, Read-Only Memory (ROM) modules, programmable ROM, etc.). The storage module 1400 may represent one or more logical or physical as well as local or remote hard disk drives (HDD) (or an array thereof). The storage module 1400 may further represent a local or remote database made accessible to the network node 1200 by a standardized or proprietary interface. The network interface module 1210 represents at least one physical interface that can be used to communicate with other network nodes. For the sake of simplicity, the following example related to the network node 1200 will refer to a repository to represent the various means that can be used to store records. The network interface module 1210 may be made visible to the other modules of the network node 1200 through one or more logical interfaces. The actual stacks of protocols used by the physical network interface(s) and/or logical network interface(s) of the network interface module 1210 do not affect the teachings of the present invention. The variants of processor module 1230, memory module 1220, network interface module 1210 and storage module 1400 usable in the context of the present invention will be readily apparent to persons skilled in the art. Likewise, even though explicit mentions of the memory module 1220 and/or the processor module 1230 are not made throughout the description of the present examples, persons skilled in the art will readily recognize that such modules are used in conjunction with other modules of the network node 1200 to perform routine as well as innovative steps related to the present invention.

Various network links may be implicitly or explicitly used in the context of the present invention. While a link may be depicted as a wireless link, the link could also be embodied as a wired link using a coaxial cable, an optical fiber, a category 5 cable, and the like. A wired or wireless access point (not shown) may be present on the link between. Likewise, any number of routers (not shown) may be present and part of the link, which may further pass through the Internet.

The present invention is not affected by the way the different modules exchange information between them. For instance, the memory module 1220 and the processor module 1230 could be connected by a parallel bus, but could also be connected by a serial connection or involve an intermediate module (not shown) without affecting the teachings of the present invention.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. Principally for reasons of common usage, these signals are at times referred to as bits, values, parameters, items, elements, objects, symbols, characters, terms, numbers, or the like. All of these terms and similar terms are to be associated with the appropriate physical quantities and are merely convenient labels applied to these quantities. The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method of calculating weighted deployment rules in an emergency-vehicle-units deployment system for a geographical area, the method comprising:
   receiving, from at least one external resource, location data and status information for each of a plurality of emergency vehicle units;
   storing the location data and status information for each of the plurality of emergency vehicle units in a memory buffer;
   storing a list of priority indicators associated to each of a plurality of posts in the memory buffer;
   storing in the memory buffer a list of weighted deployment rules for deploying the plurality of emergency vehicle units to the plurality of posts;
   applying a deployment calculation formula for calculating a deployment recommendation considering the list of weighted deployment rules, the location data, the status information and the list of priority indicators from the memory buffer, the deployment recommendation comprising one or more suggested deployments, each suggested deployment providing a suggested target post from the plurality of posts for one of the plurality of emergency vehicle units;
   at the computer, sending the deployment recommendation to the user interface module for display;
   at the computer, receiving an updated deployment recommendation from the user interface module;
   at the computer, sending the updated deployment recommendation to the user interface module for display;
   calculating an updated list of weighted deployment rules in order for the deployment calculation formula to provide a new deployment recommendation considering the updated list of weighted deployment rules, new location data, new status information and a new list of priority indicators; and
   at the computer, sending the new deployment recommendation to the user interface module for display.

2. The method of claim 1, wherein a first user inputs the updated deployment recommendation, and a second user views the new deployment recommendation.

3. The method of claim 1, further comprising, at the computer, sending a list of steps to implement the updated deployment recommendation to the user interface module for display.

4. The method of claim 1, further comprising, at the computer, receiving a user updated list of weighted deployment rules from the user interface module to provide the new deployment recommendation considering the user updated list of weighted deployment rules, the new location data, the new status information and the new list of priority indicators.

5. The method of claim 1, sending the updated deployment recommendation to a plurality of mobile computers located at each of the plurality of emergency vehicle units for display.

6. The method of claim 1, wherein the user interface module displays the updated deployment recommendation in a textual form.

7. The method of claim 1, wherein the user interface module displays the updated deployment recommendation in a graphical form.

8. The method of claim 7, wherein each of the one or more suggested deployments is represented as an arrow from one of the plurality of emergency vehicle units to the suggested target post of the plurality of posts.

9. The method of claim 7, wherein the graphical form comprises a polygon for representing a geographical sub-area within the geographical area that is reachable by the plurality of emergency vehicle units within a specified time based on the location data and the status information.

10. A computer for calculating weighted deployment rules in an emergency-vehicle-units deployment system for a geographical area, comprising:
a storage module for:
storing location data and status information for each of a plurality of emergency vehicle units;
storing a list of priority indicators associated to each of a plurality of posts; and
storing a list of weighted deployment rules for deploying the plurality of emergency vehicle units to the plurality of posts;
a user interface module for displaying a deployment recommendation; and
a processor module configured to:
receiving, from at least one external resource, location data and status information for each of a plurality of emergency vehicle units;
storing the location data and status information for each of the plurality of emergency vehicle units in a memory buffer in the storage module;
applying a deployment calculation formula for calculating a deployment recommendation considering the list of weighted deployment rules, the location data, the status information and the list of priority indicators from the memory buffer, the deployment recommendation comprising one or more suggested deployments, each suggested deployment providing a suggested target post from the plurality of posts for one of the plurality of emergency vehicle units;
sending the deployment recommendation to the user interface module for display;
receiving an updated deployment recommendation from the user interface module;
sending the updated deployment recommendation to the user interface module for display;
calculating an updated list of weighted deployment rules in order for the deployment calculation formula to provide a new deployment recommendation considering the updated list of weighted deployment rules, new location data, new status information and a new list of priority indicators; and
sending the new deployment recommendation to the user interface module for display.

11. The computer of claim 10, wherein a first user inputs the updated deployment recommendation, and a second user views the new deployment recommendation.

12. The computer of claim 10, wherein the processor is further for sending a list of steps to implement the updated deployment recommendation to the user interface module for display.

13. The computer of claim 10, wherein the processor is further for receiving a user updated list of weighted deployment rules from the user interface module to provide the new deployment recommendation considering the user updated list of weighted deployment rules, the location data, the new status information and the new list of priority indicators.

14. The computer of claim 10, wherein the processor is further for sending the updated deployment recommendation to a plurality of mobile computers located at each of the plurality of emergency vehicle units for display.

15. The computer of claim 10, wherein the user interface module displays the deployment recommendation in a textual form.

16. The computer of claim 10, wherein the user interface module displays the deployment recommendation in a graphical form.

17. The computer of claim 16, wherein each of the one or more suggested deployments is represented as an arrow from one of the plurality of emergency vehicle units to the suggested target post of the plurality of posts.

18. The computer of claim 16, wherein the graphical form comprises a polygon for representing a geographical sub-area within the geographical area that is reachable by the plurality of emergency vehicle units within a specified time based on the location data and the status information.

19. A system for calculating weighted deployment rules in an emergency-vehicle-units deployment system for a geographical area, the system comprising:
a network comprising a computer and at least one server; and
the computer being configured to:
receive location data and status information for each of a plurality of emergency vehicle units from the at least one server through the network;
store the location data and status information for each of the plurality of emergency vehicle units in a memory buffer;
store a list of priority indicators associated to each of a plurality of posts in the memory buffer;
store in the memory buffer a list of weighted deployment rules for deploying the plurality of emergency vehicle units to the plurality of posts;
apply a deployment calculation formula for calculating a deployment recommendation considering the list of weighted deployment rules, the location data, the status information and the list of priority indicators from the memory buffer, the deployment recommendation comprising one or more suggested deployments, each suggested deployment providing a suggested target post from the plurality of posts for one of the plurality of emergency vehicle units;
send the deployment recommendation to the user interface module for display;
receive an updated deployment recommendation from the user interface module; and
calculate an updated list of weighted deployment rules in order for the deployment calculation formula to provide a new deployment recommendation considering the updated list of weighted deployment rules, new location data, new status information and a new list of priority indicators.

20. The system of claim 19, wherein the computer further sends the updated deployment recommendation or the new deployment recommendation to a user interface module for display.

21. The system of claim 19, wherein the network further comprises a plurality of unit computers associated to each of the plurality of emergency vehicle units, and wherein the at least one server receives the location data and status information for each of the plurality of emergency vehicle units from the unit computers through the network, and wherein the computer sends the updated deployment recommendation to the plurality of unit computers through the network for display.

22. The system of claim 19, wherein the at least one server is a plurality of servers associated to each of the plurality of emergency vehicle units.

23. The system of claim 19, wherein the network further comprises a client computer, and wherein the computer sends the updated deployment recommendation or the new deployment recommendation to the client computer for display.

24. The system of claim 23, wherein a first user inputs the updated deployment recommendation, and a second user views the new deployment recommendation.

25. The system of claim 19, wherein the computer further receives a user updated list of weighted deployment rules from the user interface module to provide the new deployment recommendation considering the user updated list of weighted deployment rules, the new location data, the new status information and the new list of priority indicators.

* * * * *